United States Patent
Wagner et al.

(10) Patent No.: US 10,902,103 B2
(45) Date of Patent: Jan. 26, 2021

(54) SYSTEM AND METHOD FOR CONDUCTING TRANSACTIONS USING BIOMETRIC VERIFICATION

(71) Applicant: VISA INTERNATIONAL SERVICE ASSOCIATION, Foster City, CA (US)

(72) Inventors: Kim R. Wagner, Sunnyvale, CA (US); Jing Jin, San Jose, CA (US); Marcelo G. de Oliveira, Miami, FL (US); Christian Aabye, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 163 days.

(21) Appl. No.: 15/745,966

(22) PCT Filed: Jul. 29, 2016

(86) PCT No.: PCT/US2016/044761
§ 371 (c)(1),
(2) Date: Jan. 18, 2018

(87) PCT Pub. No.: WO2017/019972
PCT Pub. Date: Feb. 2, 2017

(65) Prior Publication Data
US 2018/0211022 A1    Jul. 26, 2018

Related U.S. Application Data

(60) Provisional application No. 62/199,094, filed on Jul. 30, 2015.

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/34* (2013.01); *G06Q 20/40145* (2013.01); *G06Q 20/341* (2013.01)

(58) Field of Classification Search
CPC ... G06F 21/32; G06F 21/34; G06Q 20/40145; G06Q 20/341
See application file for complete search history.

(56) References Cited

U.S. PATENT DOCUMENTS 9,117,212 B2 *   8/2015   Sheets .............. G06Q 20/40145
2004/0124246 A1 *  7/2004   Allen ................... G06Q 20/108
                                                                 235/492

(Continued)

FOREIGN PATENT DOCUMENTS

JP          2006127174 A      5/2006

OTHER PUBLICATIONS

International Search Report and Written Opinion, dated Oct. 31, 2016, in PCT Application No. PCT/US2016/044761, 13 pages.

*Primary Examiner* — Brandon S Hoffman
*Assistant Examiner* — William A Corum, Jr.
(74) *Attorney, Agent, or Firm* — Kilpatrick Townsend & Stockton LLP

(57) ABSTRACT

A biometric verification system is disclosed. The system includes a portable device which stores a biometric reference template and authentication preferences. The portable device can be used with an access device. The access device can prompt the user for a biometric sample. The access device may create a biometric sample template from the biometric sample, and the biometric sample template can be compared to the biometric reference template to determine if a user is authentic.

17 Claims, 16 Drawing Sheets

(51) Int. Cl.
　　　*G06F 21/34* 　　　　(2013.01)
　　　*G06Q 20/40* 　　　　(2012.01)
　　　*G06Q 20/34* 　　　　(2012.01)

(56) References Cited

U.S. PATENT DOCUMENTS

| | | | |
|---|---|---|---|
| 2008/0040262 | A1 | 2/2008 | Subramanian et al. |
| 2012/0313754 | A1* | 12/2012 | Bona ................. G06F 21/32 340/5.82 |
| 2013/0232073 | A1 | 9/2013 | Sheets et al. |
| 2013/0290136 | A1* | 10/2013 | Sheets ............... G06Q 30/0609 705/26.35 |
| 2013/0332365 | A1 | 12/2013 | Evans et al. |
| 2014/0172430 | A1* | 6/2014 | Rutherford ........... G06F 3/167 704/273 |
| 2014/0337635 | A1 | 11/2014 | Konvalinka |
| 2014/0372128 | A1* | 12/2014 | Sheets ................. G06Q 20/20 704/273 |
| 2015/0206136 | A1* | 7/2015 | Maddocks ........ G06Q 20/3672 705/71 |
| 2015/0332271 | A1* | 11/2015 | Collins ............. G06Q 20/4012 705/44 |
| 2016/0110529 | A1* | 4/2016 | Mathew ................ G06F 21/31 726/7 |
| 2016/0180313 | A1* | 6/2016 | Ekselius ............. G06Q 20/401 235/380 |
| 2017/0061441 | A1* | 3/2017 | Kamal ............ G06Q 20/40145 |

\* cited by examiner

SYSTEM AND METHOD FOR CONDUCTING TRANSACTIONS USING BIOMETRIC VERIFICATION

CROSS-REFERENCES TO RELATED APPLICATIONS

This application is a National Stage of International Application No. PCT/US2016/044761 filed Jul. 29, 2016, and which claims the benefit of the filing date of U.S. Provisional Patent Application No. 62/199,094, filed on Jul. 30, 2015, which are all herein incorporated by reference in their entirety.

BACKGROUND

It is typical for individuals to conduct transactions using cards or other portable devices that have been issued to them by either banks, government agencies, healthcare providers, or other entities. An issuer of a portable device such as a card may either imprint or store credentials on the card, so that a user may obtain a resource such as a good or service. It is desirable to ensure that transactions utilizing portable devices such as cards are secure.

One user verification method that can be used in a transaction involving a portable device is biometric verification. In exemplary biometric verification processes, cardholders are verified using unique biological traits such as fingerprints, retinal scans, etc. In a typical biometric process, a terminal can obtain a sample of an individual's biometric, match it to a template that has been stored in a database, and then output a response indicating that the obtained biometric template either matches or does not match the stored biometric template. In a system such as this, an issuer of the card serves as a verification entity and verifies the biometric. The issuer is the entity that enrolls the user's biometric as part of a registration process. However, beyond enrollment of a cardholder's biometric, the issuers have little influence over the biometric verification process and the interactions between the card, terminal which interacts with the card, and cardholder. This can be a problem in a transaction processing system where there are many issuers and many different resource providers. For instance, data that might be useful for one issuer might not be useful for another issuer; yet both issuers need to make informed decisions regarding whether to approve transactions conducted with the portable devices.

In such conventional systems and methods, if the same verification process is used across all merchants and issuers, then issuers will need to create and build their own systems and methods to compensate for any perceived deficiencies in the standard verification process. Illustratively, a first issuer may determine that the standard verification process is acceptable. On the other hand, a second issuer may determine that additional authentication is needed, because it may perceive that the standard authentication process is unreliable. In this case, the second issuer may determine that it needs to perform additional authentication or verification processes before it can authorize transactions from certain potentially fraudulent users. Since the second issuer is unable to interact or influence the behavior or systems used by the thousands of merchants from which it receives transactions, it will need to contact the users separately during the transactions to verify or authenticate them. This may involve setting up separate alerts systems or may require calling each user to verify their identities. This results in additional data processing and systems, and is inconvenient and burdensome for users and issuers.

Embodiments of the invention address these and other issues, individually and collectively.

BRIEF SUMMARY

Embodiments of the invention are address the above problems and other problems by allowing each issuer in a transaction processing system to store verification preferences on a portable device such as a card. In some embodiments, the verification preferences on the portable device can indicate what type of biometric is preferred by the issuer of the portable device. For example, the verification preferences may indicate how many times an individual is allowed to attempt to verify his or her biometric during a specific authentication session. In addition, an issuer may want to allow a cardholder to verify a different biometric sample if the first attempt at verification fails. In such a scenario, the issuer could set a preference as to how many different samples the cardholder may attempt to verify and the amount of tries he or she is allowed for each specific type of biometric sample (e.g. the issuer may prefer that a cardholder is allowed to verify up to 3 samples: right thumb, left thumb, right index finger in that order and up to three times each).

Embodiments of the invention also allow issuers to improve their biometric authentication systems over time. In embodiments of the invention, the issuer can improve the verification process over time by receiving additional data each verification session. The additional data informs the issuer as to which biometrics are more reliable and/or easier to verify. The additional data could be in the form of a match score, reliability index, or some other metric. In addition, it would be beneficial if the additional data was sent through existing communication channels and messaging systems. Thus, embodiments of the invention allow for issuer preferences and the communication of additional verification data to the issuer in a transaction verification process.

One embodiment of the invention is directed to a method comprising coupling a portable device comprising a biometric verification applet comprising biometric reference template data to an access device comprising a biometric reader. The biometric reference template data comprises a biometric reference template of a user of the portable device and verification entity preferences. Verification entity preferences are described in detail below, but may include and are not limited to the type of biometric verification method desired (e.g., fingerprint vs. retinal scan), and how the biometric verification method is to be performed (e.g., the maximum number of biometric scan attempts).

The method can also include receiving, by the portable device and from the access device, a biometric sample template of the user using the portable device. The method also includes verifying, by the portable device, the biometric sample template by comparing the biometric sample template to the biometric reference template and providing, by the portable device, to the access device, a verification result of the verification of the biometric sample template.

Another embodiment of the invention can be directed to a portable device configured to perform the above-described method.

Another embodiment of the invention can be directed to a method comprising coupling a portable device comprising a biometric verification applet comprising biometric reference template data with an access device comprising a biometric reader. The biometric reference template data comprises a biometric reference template of a user of the portable device and verification entity preferences. The method also includes providing a prompt, by an interface of the access device for a biometric sample, receiving the biometric sample from the interface, and providing, by the access device, a biometric sample template representing the biometric sample to the portable device. The portable device compares the biometric sample template to the biometric reference template and produces a verification result. The method also includes receiving, by the access device, the verification result from the portable device.

Another embodiment of the invention can be directed to an access device configured to perform the above-described method.

These and other embodiments of the invention are described in further detail below.

DETAILED DESCRIPTION

Figure 1:
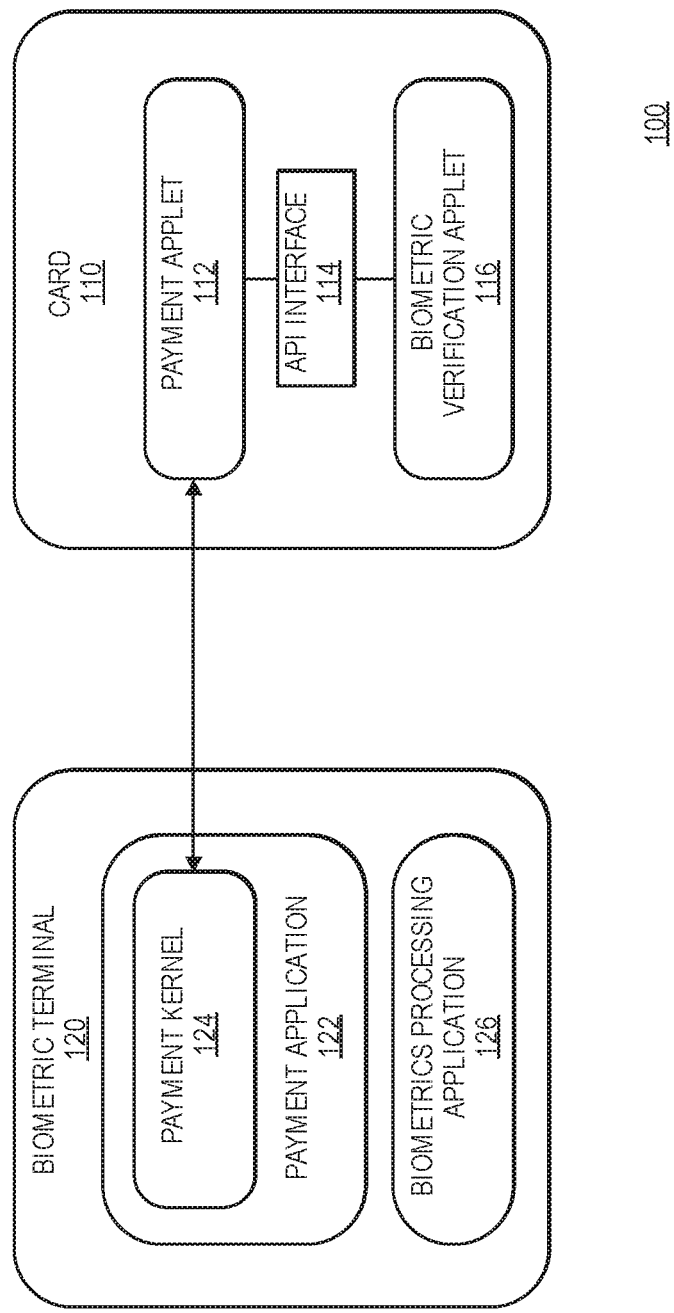
FIG. 1 shows a block diagram of a system for performing biometric verification according to embodiments of the invention.

Before discussing specific embodiments and examples, some descriptions of terms used herein are provided below.

An "access device" (which may be an example of a terminal) may be any suitable device for accessing a remote system or computer. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. The access device may be a terminal such as a POS terminal. In some embodiments, the access device may also include a biometric reader capable of capturing biometric samples, in which case, the access device may be a "biometric terminal". A terminal may support one or more cardholder verification methods including biometric verification, PIN, signature, etc.

A "biometric sample" includes data that can be used to uniquely identify an individual based upon one or more intrinsic physical or behavioral traits. For example, a biometric sample may include retinal scan and tracking data (i.e., eye movement and tracking where a user's eyes are focused). Further examples of biometric samples include a face, fingerprint, voiceprint, palm print, DNA, body scan, etc.

A "biometric sample template" can be a digital representation of an obtained biometric sample. In some embodiments, the biometric sample template can represent one or more biometric samples including variable features associated with biometric samples such as facial images and voice samples.

A "biometric reference template" can be a digital representation of biometric sample that has been previously enrolled or stored. For example, a biometric reference template may be a digital representation of characteristics that have been extracted from one or more biometric samples that have been enrolled with a verification entity by a cardholder so that the cardholder may be verified at a later point in time.

A "biometric data block" or BDB can be any data that contains one or more biometric sample templates and may also contain additional information that is relevant to the process of biometric verification.

A "biometric matching object" or BMO can be a data element that contains one or more biometric reference templates and a biometric program. A BMO can have a specific biometric type and biometric subtype signifying the type of biometric reference template it contains (finger, palm, iris, face, voice, etc.) and the subtype of the reference template (right index finger, left iris, left middle finger, etc.) respectively.

A "biometric information template" or BIT can be a data element that provides descriptive information regarding biometric formats and biometric processes supported on a portable device.

A "biometric program" can be a set of instructions communicated between an integrated chip card and a compatible biometric terminal. Biometric programs may be standardized, and portable devices and terminals capable of performing a biometric program may be certified to ensure security and reliability.

A "biometric solution ID" can be a data element that ensures that a biometric card certified by a biometric program will only perform biometric verification on a terminal that is certified by the same biometric program. Terminals and cards certified by the same program can be assigned the same biometric solution ID.

A "cardholder verification method" or CVM can be any method used to verify the authenticity of a cardholder (or other user) in a transaction. For example, a CVM can be an online PIN verification, a signature verification, an Offline PIN verification, a biometric verification (e.g. finger, palm, iris, voice, face, etc.), etc. A "cardholder verification method" can be generically referred to as a "user verification method."

A "CVM list" can be a list of CVMs that a cardholder may be verified with and identifies which methods of verification of the cardholder are supported by a payment application or payment applet. A "CVM list" can be generically referred to as a "UVM list" or "user verification method."

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes, login information, etc.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g., memory element or secure element) that may be executable by a processor to complete a task. Examples of an application include a biometric sample application, an authentication application, or a processing network application. An application may include a mobile application. An application can also be a utility program performing one or a predesignated set of functions and be referred to as an "applet". An application may be designed to streamline the purchase and payment process or the process for accessing a secure area or secure data. An application may enable a user to initiate a transaction with a resource provider or merchant and authorize the transaction.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement. Detokenization refers to the reversal of tokenization, in which the substitute data is replaced by the sensitive data so that the transaction may be processed and/or authorized.

A "user" may include an individual. In some embodiments, a user may be associated with one or more personal accounts and/or mobile devices. The user may also be a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically be a business entity (e.g., a bank) that maintains an account for a user. An issuer may also issue payment credentials stored on a user device, such as a cellular telephone, smart card, tablet, or laptop to the consumer. An issuer can also be a verification entity that verifies the authenticity of a user and sets verification entity preferences.

An "authorization system" may refer to a system that can authorize transactions or aspects of transactions. In some embodiments, an authorization system may utilize information to determine the probability or likelihood that a transaction is fraudulent.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to a payment device (such as account number, CVV values, expiration dates, etc.) may be securely transmitted between the two entities to facilitate a transaction.

A "portable device" may include a device that is portable. A portable device may be used to conduct a financial transaction to pay for a good or service, and may be a "payment device." A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, an electronic or digital wallet, and the like. If the payment device is in the form of a debit, credit, or smartcard, the payment device may also optionally have features such as magnetic stripes. Such devices can operate in either a contact or contactless mode. A portable device may also include an integrated circuit such as a chip or microchip and may be referred to as an integrated circuit card or ICC. Other types of payment devices may include wearable devices (e.g., smartwatches, rings, etc.), or vehicles that remote communication capabilities (e.g., automobiles).

A "server computer" is typically a powerful computer or cluster of computers. For example, the server computer can be a large mainframe, a minicomputer cluster, or a group of servers functioning as a unit. In one example, the server computer may be a database server coupled to a Web server.

FIG. 1 shows a block diagram of a system for performing biometric verification according to an embodiment of the invention. System 100 comprises a biometric terminal 120 and a card 110. Although a card 110 is specifically illustrated, the card 110 could alternatively be any suitable portable device.

Biometric terminal 120 comprises a payment application 122. Payment application 122 may comprise of software used to process a payment transaction. Payment application 122 may accept a payment amount as an input and return a transaction result as an output. Payment application 122 may communicate with card 110 in a transaction using payment kernel 124. Payment kernel 124 may comprise of a set of functions that provides all necessary processing logic and data that is used to perform a contact or contactless transaction. An exemplary payment kernel 124 may be an EMV (Europay, MasterCard, and Visa) Kernel. Payment kernel 124 may follow EMV ICC (Integrated Circuit Card) specifications for payment systems which forms the basis of all EMV compliant terminals.

Biometric terminal 120 also comprises biometric processing application 126, which may, in conjunction with a data processor, process a biometric sample template captured by a biometric reader in the biometric terminal 120. In one embodiment, biometric processing application 126 is implemented as an integrated part of biometric terminal 120. In another embodiment, biometric processing application 126 is a separate component from biometric terminal 120.

Biometric processing application 126 may support the processing of at least one type of biometric sample and/or biometric sample template. In some embodiments, if biometric processing application 126 supports finger verification, it may be able to support the processing of a biometric sample template of any one of ten fingers belonging to a user and may support the processing of a biometric sample template of up to all ten fingers of the user. Similarly, if it supports palm verification, biometric processing application 126 may support the processing of a biometric sample template of either left or right palms or both palms belonging to the user. If biometric processing application 126 supports iris verification, it may support the processing of a biometric sample template of either left and right irises belonging to the user or both. Biometric processing application 126 may be able to construct a Biometric Data Block (BDB) comprising the biometric sample template captured by the biometric reader and communicate the BDB to payment application 122. In one embodiment, the BDB may be encrypted using appropriate encryption keys so that a cardholder's biometric sample template cannot be obtained by an untrusted party.

Card 110 comprises payment applet 112, API interface 114, and biometric verification applet 116. In a transaction, a user inserts card 110 into a card reader of biometric terminal 120 and then card 110 may communicate with biometric terminal 120 using payment applet 112. Payment applet 112 may manage interactions between card 110 and biometric terminal 120 including biometric verification try counters, biometric verification results, and biometric related card risk management checks. An exemplary payment applet 112 may be Visa Smart Debit/Credit (VSDC) applet. To support biometric verification, payment applet 112 may contain a list of cardholder verification methods or CVM list, which may define a set of bits that indicate the support of a type of biometric verification on card 110. Using the CVM list, biometric terminal 120 may learn the capabilities of card 110 and select the appropriate CVM (i.e. appropriate type of biometric verification) to perform in a transaction.

Payment applet 112 may communicate with biometric verification applet 116 using API interface 114. In one embodiment, API interface 114 may be the Interface BioTemplate provided by Java Card 2.2.2. In one embodiment, payment applet 112 and biometric verification applet 116 may be implemented as one applet combining both functionalities.

Biometric verification applet 116 may contain one or more biometric reference templates. Biometric verification applet 116 may also perform template matching by comparing a biometric sample template with the one or more biometric reference templates. After comparing the biometric sample template with one or more biometric reference templates, it may generate a biometric verification result and send it to payment applet 112.

Biometric verification applet 116 may support at least one biometric verification method using any suitable type of biometric sample. In some embodiments, if biometric verification applet 116 supports finger verification, it may be able to support the verification of any one of ten fingers belonging to a user and may support the verification of up to all ten fingers of the user. Similarly, if it supports palm verification, biometric verification applet may support the verification of either left or right palms or both palms belonging to the user. If biometric verification applet 116 supports iris verification, it may support the verification of either left and right irises belonging to the user or both.

According to embodiments of the invention, a user enrolls his or her biometric reference template(s) on card 110. In one embodiment, the biometric reference template(s) may be enrolled with an issuer of card 110. When the card 110 or other portable device is issued by the issuer or any time after issuance, the issuer may request a biometric sample from the eventual user of the card and this biometric sample may be converted to a reference biometric template and may be stored on the card. The request may occur, for example, a local branch of the issuer (e.g., a local bank), or the request may occur over a remote communications network (e.g., over the Internet). In the latter case, the user may have a biometric reader that can obtain a biometric sample from the user, and a device that can write any biometric reference template to their portable device.

The issuer of card 110 may also serve as a verification entity. The verification entity may also issue verification entity preferences that may be stored on card 110 along with the biometric reference template(s). Examples of verification entity preferences may include a preferred biometric type or preferred biometric subtype to be verified and/or a preferred amount of retries for a given biometric type or biometric subtype. A biometric type may be a particular type of biometric sample such as a finger sample, palm sample, iris sample, face sample, voice sample, etc. A biometric subtype may be a specific aspect of a specific type of biometric sample. For example, a subtype of a fingerprint biometric sample may be a right index finger, a left iris, a left middle finger, etc.).

Biometric verification applet 116 may store biometric reference template data comprising a biometric reference template and verification entity preferences in the form of Biometric Matching Objects (BMOs), each of which supports a matching mechanism. Each BMO may comprise a biometric program(s) identified by a biometric solution ID(s) under which the matching mechanism is certified as well as a type of biometric verification to be performed by the matching mechanism. Each BMO may indicate the type of biometric reference template it contains (finger, palm, iris, face, voice, etc.) and the subtype of the reference template (right index finger, left iris, left middle finger, etc.). The biometric subtype may also indicate that the BMO may contain multiple biometric reference templates. For example, if the BMO contains multiple biometric reference templates, then the BMO may support 1:N matching, wherein a biometric sample template may be compared to N number of biometric reference templates stored in the BMO and matching may be deemed successful if the biometric sample template matches any one of the biometric reference templates.

The biometric reference template stored on the card may include a template that is completely in standardized format, completely in proprietary format, or a combination of partially standardized format and partially proprietary format. Information regarding biometric formats and solutions supported on card 110 may be present within a biometric information template (BIT) stored on payment applet 112. In some embodiments, the data in the BIT may be Tag-Length-Value (TLV). For example, the BIT may contain a biometric header indicating that the data in the BIT is compliant with a specific file exchange format. Additionally, if the biometric reference template stored on the card is partially standardized format and partially proprietary format, then a level 2 Biometric Header Template (BHT) 1 and BHT 2 can be present in the BIT indicating that the format of the biometric solutions on card 110 are specified by a format owner or by a card manufacturer.

In a verification session, biometric verification applet 116 may provide biometric verification results (success or fail) to payment applet 112. In one embodiment, additional data including an error message, offline biometric verification reliability index, False Accept Rate (FAR), False Reject Rate (FRR), matching score, threshold of matching score, and/or any data regarding the number of verification attempts made by the user may also be sent along with the biometric verification results from biometric verification applet 116 to payment applet 112.

In one embodiment, the BDB containing the biometric sample templates may be enciphered and card 110 may contain a data encipherment key that may be used to decipher the BDB. For example, when card 110 receives enciphered biometric data from biometric terminal 120 during a transaction, payment applet 112 may decrypt enciphered biometric data to recover the biometric sample template captured by biometric terminal 120. Then, payment applet 112 may determine how to forward the BDB containing the biometric sample template captured by biometric terminal 120 to biometric verification applet 116 for verification. In some embodiments, an issuer of card 110 or a verification entity may have a specific data encipherment key known as a data encipherment master derivation key. In one embodiment, decipherment may be performed according to an RSA-KEM algorithm defined in [ISO 18033-2].

Once payment applet 112 has received the biometric verification results and the additional data from biometric verification applet 116, it may provide the biometric verification results and the additional data to biometric terminal 120 so that the biometric verification may be completed and the transaction may be processed. In one embodiment, the issuer of card 110 or the verification entity may also serve as an authorization entity that authorizes a transaction, and the biometric verification results received by biometric terminal 120 may be forwarded along with the additional data to the authorization entity in the form of an authorization request message so that the transaction may be approved or declined.

By forwarding additional data such as an error message, offline biometric verification reliability index, False Accept Rate (FAR), False Reject Rate (FRR), matching score, threshold of matching score, and/or any data regarding the number of verification attempts made by the user to an authorization entity such as an issuer, the issuer can make determinations as to how to improve the authentication process or modify fraud detection processes. For instance, an issuer might use the number of verification attempts to for each type of biometric to determine which type of biometric sample or subtype thereof might be best in authenticating a user. If many legitimate users use a retinal scan and routinely exceed the designated number of verification attempts, then this may indicate that the process is not as reliable as other processes involving other biometric samples. With regard to fraud processing, a low number of attempts may indicate a lower likelihood of fraud, while a higher number of attempts may indicate a higher likelihood of fraud.

Figure 2:
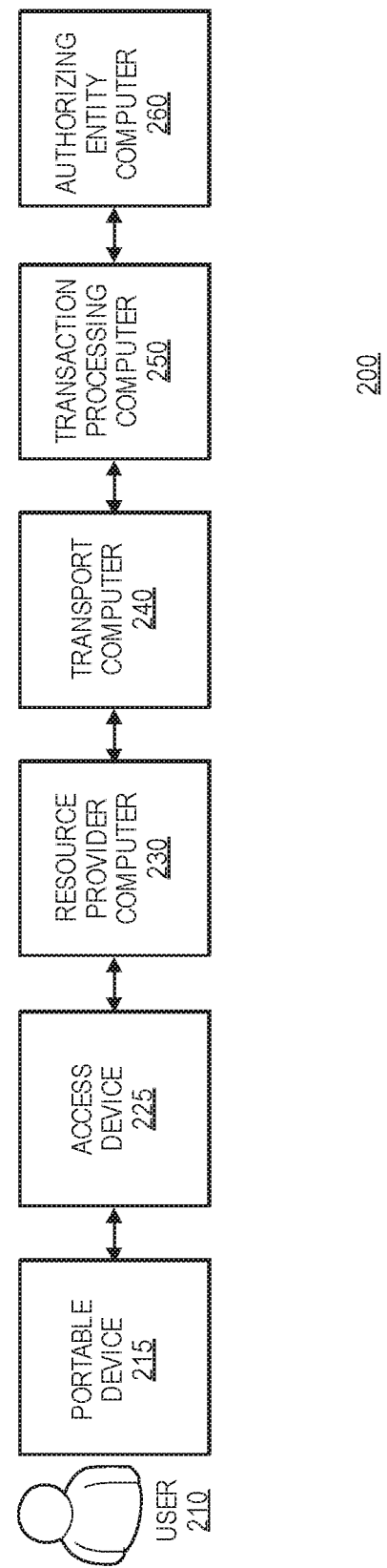
FIG. 2 shows a block diagram of a system for conducting a transaction according to embodiments of the invention.

FIG. 2 shows a block diagram of a system for conducting a transaction according to an embodiment of the invention. System 200 comprises a number of components. System 200 comprises portable device 215 which may be associated with user 210 and may be able to provide credentials to access device 225. An exemplary portable device 215 may be card 110 of FIG. 1, and an exemplary access device 225 may be biometric terminal 120 of FIG. 1. System 200 also comprises resource provider 230, transport computer 240, transaction processing computer 250, and authorizing entity computer 260. Access device 225 may be associated and in communication with resource provider computer 230. Further, resource provider computer 230, transport computer 240, transaction processing computer 250, and authorizing entity computer 260 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

User 210 may be able to use portable device 215 to conduct transactions with a resource provider associated with resource provider computer 230. Portable device 215 may store information associated with user 210 and/or a payment account. For example, portable device 215 may store payment credentials as well as personal information such as a name, address, email address, phone number, or any other suitable identification information of user 210. Portable device 215 may also store biometric data that may be read by access device 225. Portable device 215 may provide this information to access device 225 during a transaction.

Figure 3:
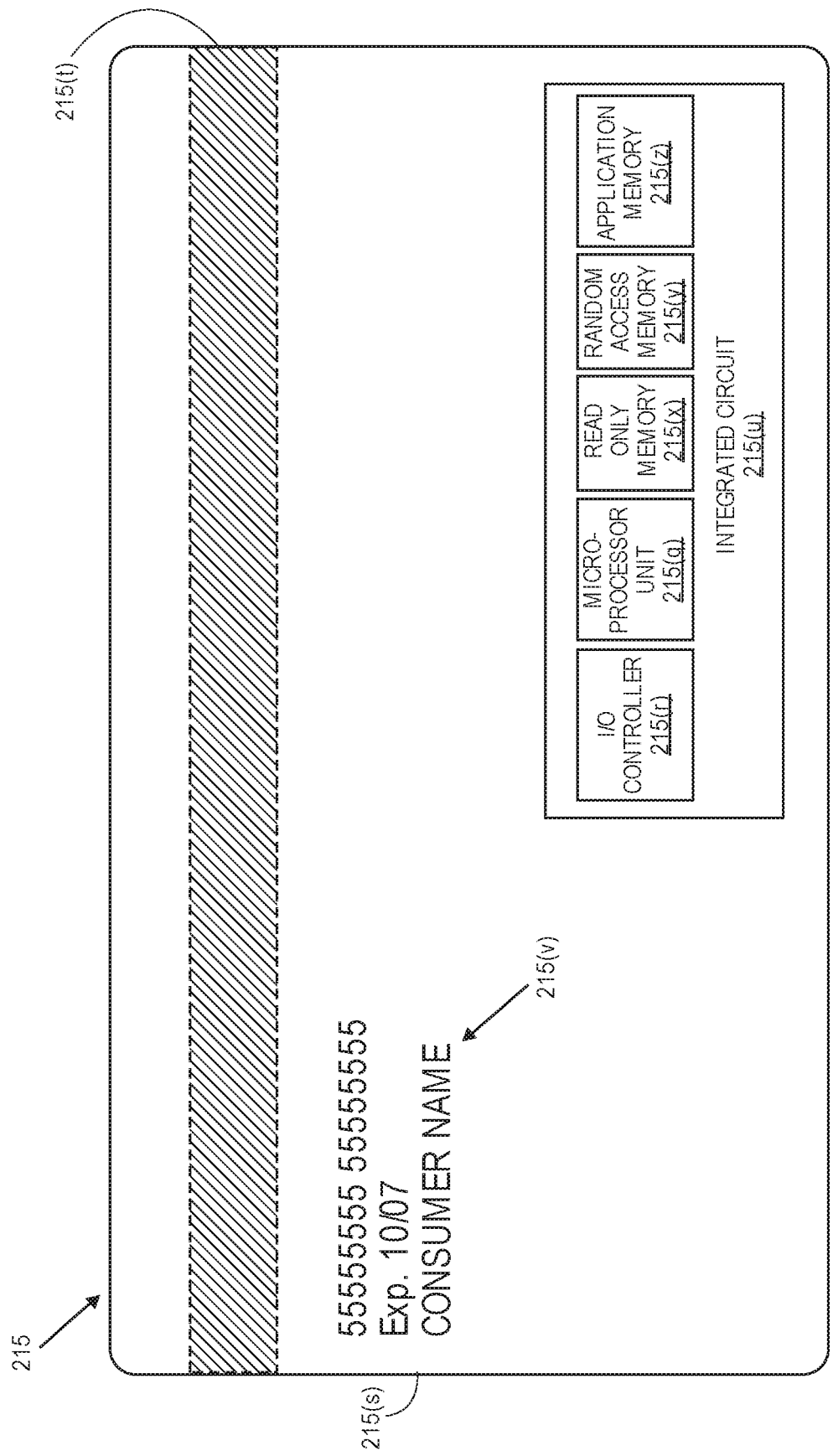
FIG. 3 shows a diagram of a portable device according to an embodiment of the invention.

FIG. 3 shows an example of a portable device 215 in the form of a card. As shown, portable device 215 comprises a plastic substrate 215(s). A magnetic stripe 215(t) may be on the plastic substrate 215(s). User information 215(v) such as an account number, expiration date, and/or a user name may be printed or embossed on the card. An integrated circuit 215(u) for interfacing with an access device may be present on, or embedded within, the plastic substrate 215(s). The integrated circuit 215(u) may comprise a microprocessor unit 215(q) for executing programmed instructions. The integrated circuit 215(u) may further comprise an I/O controller 215(r). The I/O controller 215(r) manages the flow of data between the microprocessor unit 215(q) and a Card Acceptance Device (CAD) such as a point of sale terminal (e.g. access device 225). Additionally, integrated circuit 215(u) may comprise of read only memory (ROM) 215(x), random access memory (RAM) 215(y), and application memory 215(z). ROM 215(x) can be where instructions are permanently burned into memory by a silicon manufacturer. These instructions may include when the power supply is activated and other fundamental instructions of the chip operating system. RAM 215(y) can be memory that serves as a temporary storage of results such as verification results or any other input/output communications. Application memory 215(z) can be memory that is used by an executing application to store information on portable device 215 and may be electronically erased and rewritten. Examples of executing applications may include a payment application, verification application, etc. Application memory 215(z) may follow international standards, which state that application memory 215(z) should retain data for up to 10 years without electrical power and should support at least 10,000 read-write actions during the life of portable device 215. A user may initiate a payment transaction with resource provider computer 230 by coupling portable device 215 to access device 225. In one embodiment, this is done by physically coupling portable device 215 to access device 225.

Figure 4:
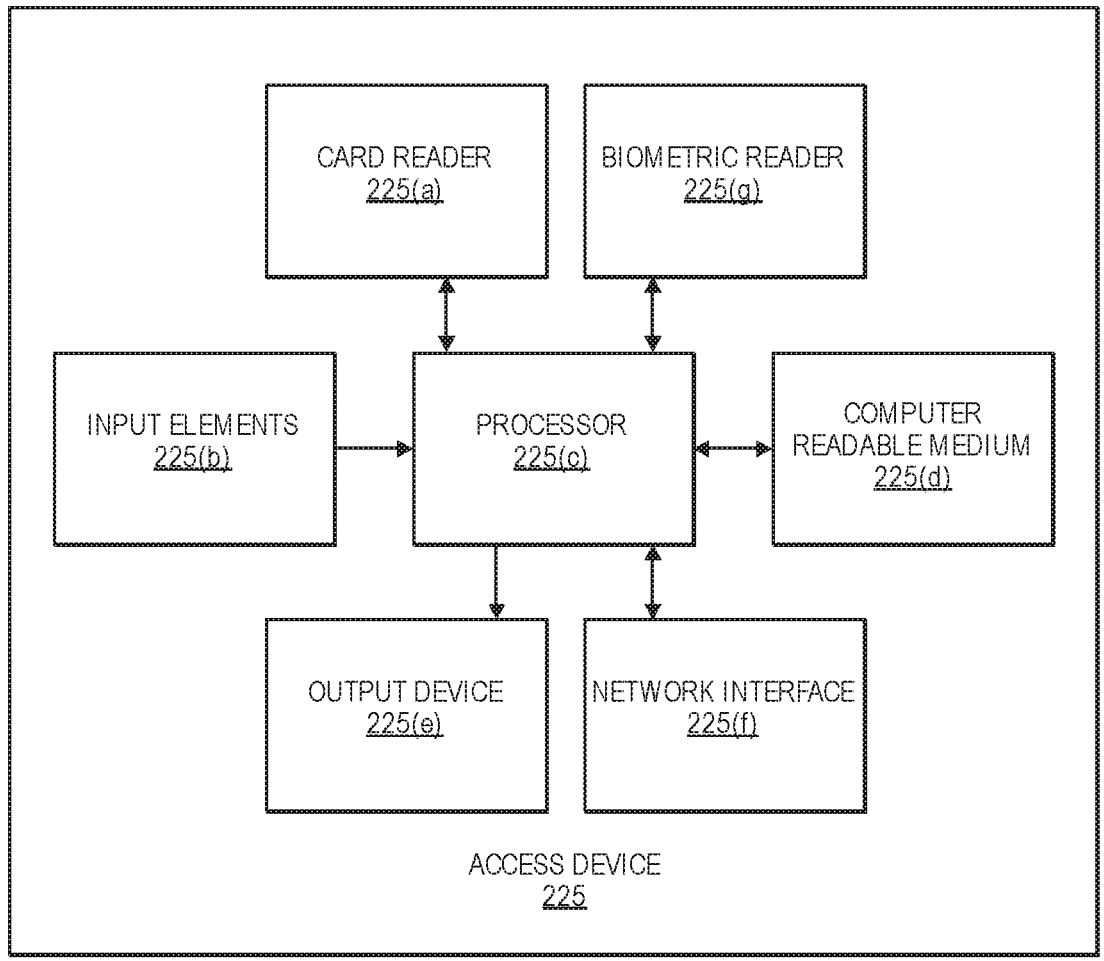
FIG. 4 shows a block diagram of an access device according to an embodiment of the invention.

FIG. 4 shows a block diagram of access device 225 according to an embodiment of the invention. Access device 225 may comprise a processor 225(c) operatively coupled to a computer readable medium 225(d) (e.g., one or more memory chips, etc.), input elements 225(b) such as buttons or the like, one or more card readers 225(a) (e.g., a contact chip reader, a contactless reader, a magnetic stripe reader, etc.), one or more biometric readers 225(g) used to take one or more biometric samples of a user (e.g. finger, palm, iris, voice, and/or face), an output device 225(e) (e.g., a display, a speaker, etc.) and a network interface 225(f). A housing may house one or more of these components.

The computer readable medium 225(d) may comprise instructions or code, executable by a processor. The instructions may include instructions for sending a command to portable device 215 upon making contact with that device, and instructions for communicating with portable device 215 to obtain credentials and process a transaction. The computer readable medium 225(d) may also include instructions for requesting authorizing of a transaction with the authorizing entity computer 260, and instructions for any other suitable function as described herein. For example, the computer readable medium 225(d) may comprise of a payment application and/or payment kernel as well as a biometric processing application comprising instructions for performing biometric verification in a transaction.

Referring back to FIG. 2, resource provider computer 230 may be associated with a resource provider. The resource provider may engage in transactions, sell goods or services, or provide access to goods or services to user 210. The resource provider may accept multiple forms of payment (e.g. portable device 215) and may use multiple tools to conduct different types of transactions. For example, the resource provider may operate a physical store and use access device 225 for in-person transactions. The resource provider may also sell goods and/or services via a website, and may accept payments over the Internet.

Authorization requests submitted by resource provider computer 230 or by access device 225 may be sent to transport computer 240 (which may be an acquirer computer). Transport computer 240 may be associated with resource provider computer 230, and may manage authorization requests on behalf of resource provider computer 230.

Transaction processing computer 250 may be disposed between transport computer 240 and authorizing entity computer 260. Transaction processing computer 250 may include data processing subsystems, networks, and operations used to support and deliver authorization services, exception file services, and clearing and settlement services. For example, transaction processing computer 250 may comprise a server coupled to a network interface (e.g., by an external communication interface), and databases of information. Transaction processing computer 250 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Transaction processing computer 250 may use any suitable wired or wireless network, including the Internet.

Transaction processing computer 250, transport computer 240, and authorizing entity computer 260 may operate suitable routing tables to route authorization request messages using payment credentials, payment tokens, and/or other suitable identifiers.

Authorizing entity computer 260 may issue and manage a payment account to user 210 which may be associated with portable device 215. Authorizing entity computer 260 may also represent a verification entity that may choose to verify user 210 using a specific verification method such as through biometric verification or through a specific type of biometric verification depending on set preferences. Authorizing entity computer 260 may be able to authorize transactions that involve the payment account. Before authorizing a transaction, authorizing entity computer 260 may authenticate payment credentials received in the authorization request, and check that there is available credit or funds in an associated payment account. Authorizing entity computer 260 may also receive and/or determine a risk level associated with the transaction, and may weigh the risk when deciding whether or not to authorize the transaction. If authorizing entity computer 260 receives an authorization request that includes a payment token, the authorizing entity computer 260 may be able to de-tokenize the payment token in order to obtain the associated payment credentials. Authorizing entity computer 260 may be able to approve or decline a transaction and may generate an authorization response message communicating the approval or decline of the transaction. The authorization response message may be sent back to access device 225 via transaction processing computer 250, transport computer 240, and resource provider computer 230.

According to embodiments of the invention, user 210 may be authenticated in a transaction involving system 200 using biometric verification. Once user 210 has been authenticated, the transaction can be processed and eventually authorized by authorizing entity computer 260. At the end of the day or at any other suitable period of time after the authorization response message is received by the resource provider represented by resource provider computer 230, a clearing and settlement process is performed between an acquirer represented by transport computer 240, the transaction processing network represented by transaction processing computer 250, and an authorizing entity represented by authorizing entity computer 260.

Figure 5:
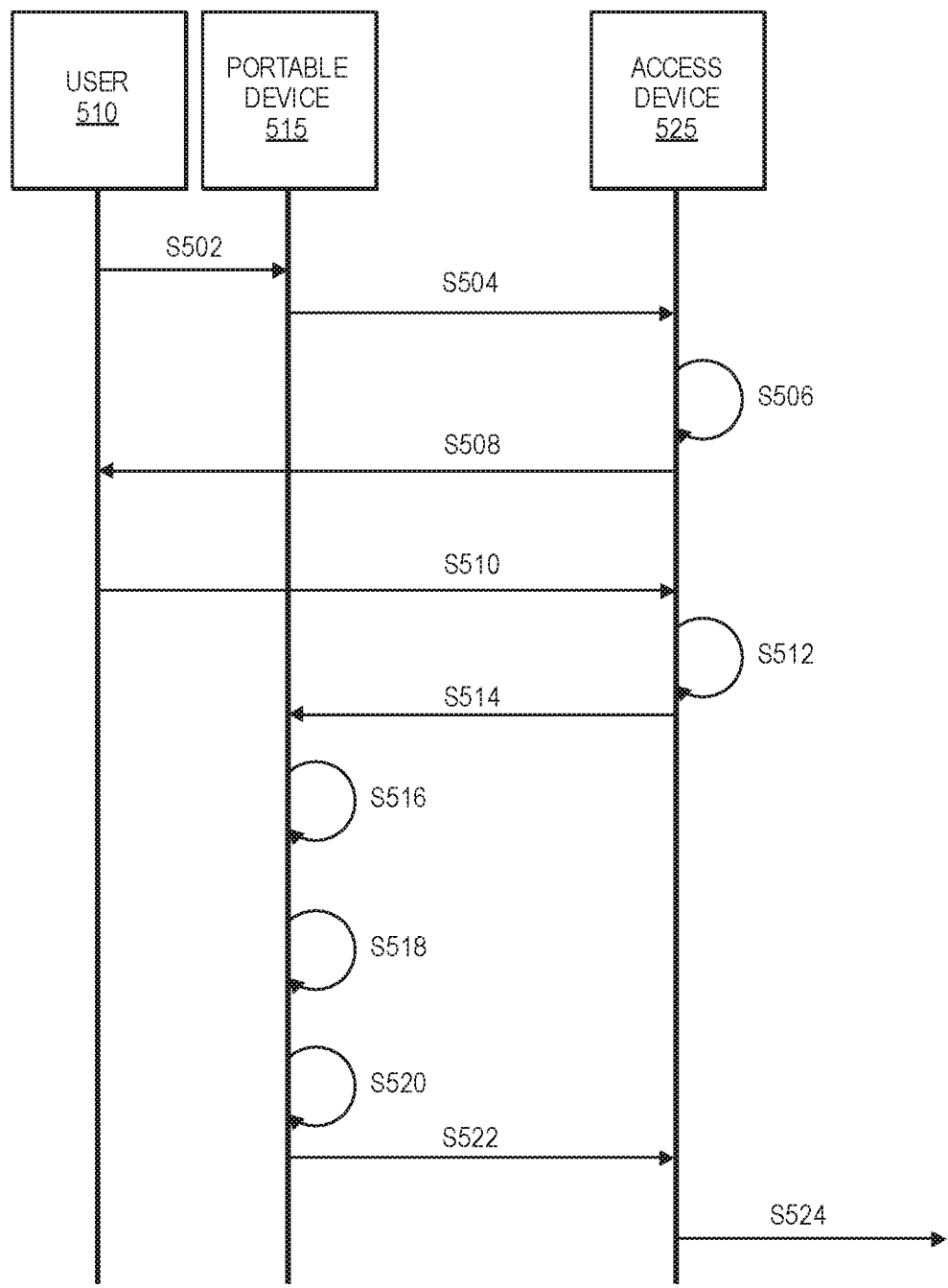
FIG. 5 shows a flow diagram illustrating a method for performing biometrically verifying a user in a transaction according to an embodiment of the invention.

FIG. 5 shows a system and method for performing biometrically verifying a user according to an embodiment of the invention. The system involves a user 510, a portable device 515, and an access device 525. In step S502, the user 510 wants to conduct a transaction and presents his or her portable device 515 containing biometric reference template data. The biometric reference template data may comprise a biometric reference template and verification entity preference such as the preferred biometric type or subtype of verification and/or the preferred amount of attempts for each type of biometric verification. In step S504, the portable device 515 is coupled to the access device 525 and initiates a session with the access device 525, wherein the user 510 may be authenticated in the transaction using biometric verification. According to one embodiment, the user 510 initiates the session by physically coupling portable device 515 to access device 525. In other embodiments, the coupling of the portable device 515 to the access device 525 may occur through a wireless link such as Bluetooth (classic or BLE), Wi-Fi, or NFC (Near Field Communications).

In step S506, the access device 525 recognizes that biometric verification is available and reads any other information stored on the portable device 515 needed for biometric verification.

In step S508, the access device 525 asks the user 510 for his or her biometric sample as indicated by the verification entity preferences received from the portable device 515. The access device 525 may comprise of a user interface, which may prompt the user 510 for his or her biometric sample. The prompt may occur by displaying a message on a display screen or by providing an audio signal requesting that the user provide his or her biometric sample.

In step S510, the user 510 enters or provides his or her biometric sample into the access device 525. In step S512, the access device 525 creates a biometric sample template of the biometric sample captured from the user 510. In step S514, the access device 525 sends the biometric sample template to the portable device 515 in the form of a biometric data block (BDB) which is received by a payment applet on the portable device 515. In step S516, the BDB containing the biometric sample template is transmitted via an API interface to a biometric verification applet for template matching i.e. biometric verification.

In step S518, the biometric verification applet on portable device 515 compares the biometric sample template received from the access device 525 to the biometric reference template stored on the portable device 515.

In step S520, the biometric verification applet sends the results of the comparison (i.e. the verification results) to the payment applet so that it may communicate the verification results to the access device 525.

In step S522, the payment applet on the portable device 515 sends the verification results to the access device 525. If the verification failed, system 500 may repeat the same process starting at S506 again, depending on the verification entity preferences. For example, the verification entity preferences may specify that the user 510 may attempt to verify a sample of his or her index finger up to three times (i.e. three tries), and/or the verification entity preferences may specify that the user 510 may attempt to verify a sample of his or her thumb if he or she fails to verify the sample of his or her index finger. Conversely, the access device 525 may determine that the user 510 has reached his or her maximum amount of attempts at verification and may terminate the session (and therefore the transaction) once the access device 525 has determined that the biometric verification has failed. If the verification result contains an indication that the biometric verification is successful, the access device may generate an authorization request message containing the verification result along with additional data relating to the process of verifying the biometric sample such as the number of verification attempts made by the user 510.

In step S524, the authorization request message comprising the verification results and the additional data are sent along a channel of communication to a verification entity that issued the verification entity preferences so that the transaction may be processed. Further details regarding the authorization process using the authorization request message is described above and need not be repeated here.

Figure 6:
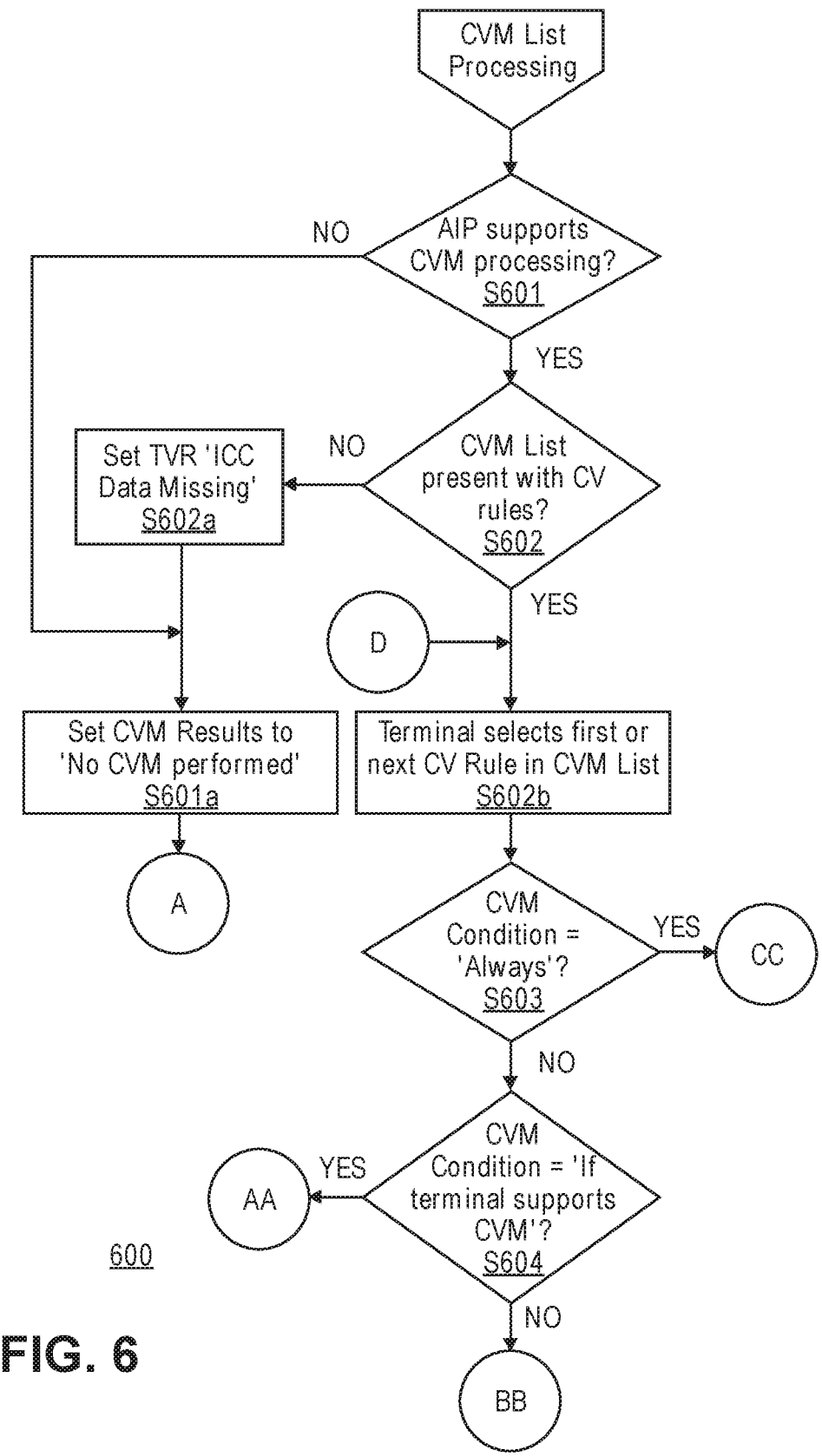
FIG. 6 shows a flowchart illustrating a verification process executed by an access device according to an embodiment of the invention.
Figure 6:
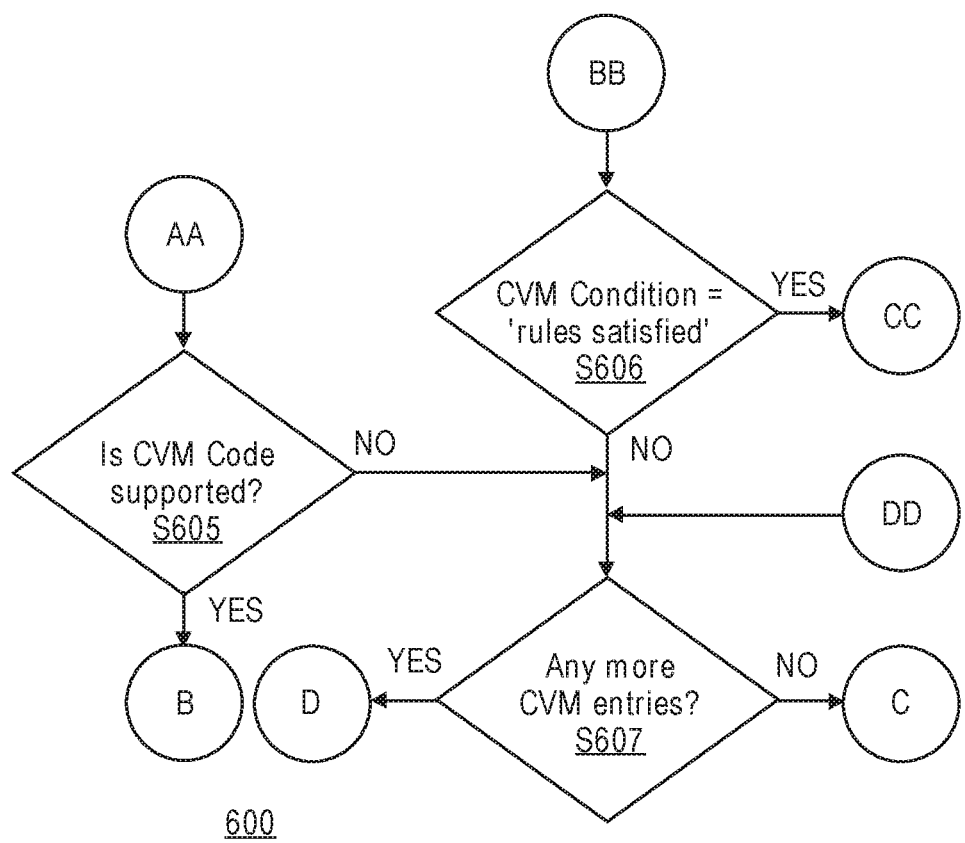
Figure 6:
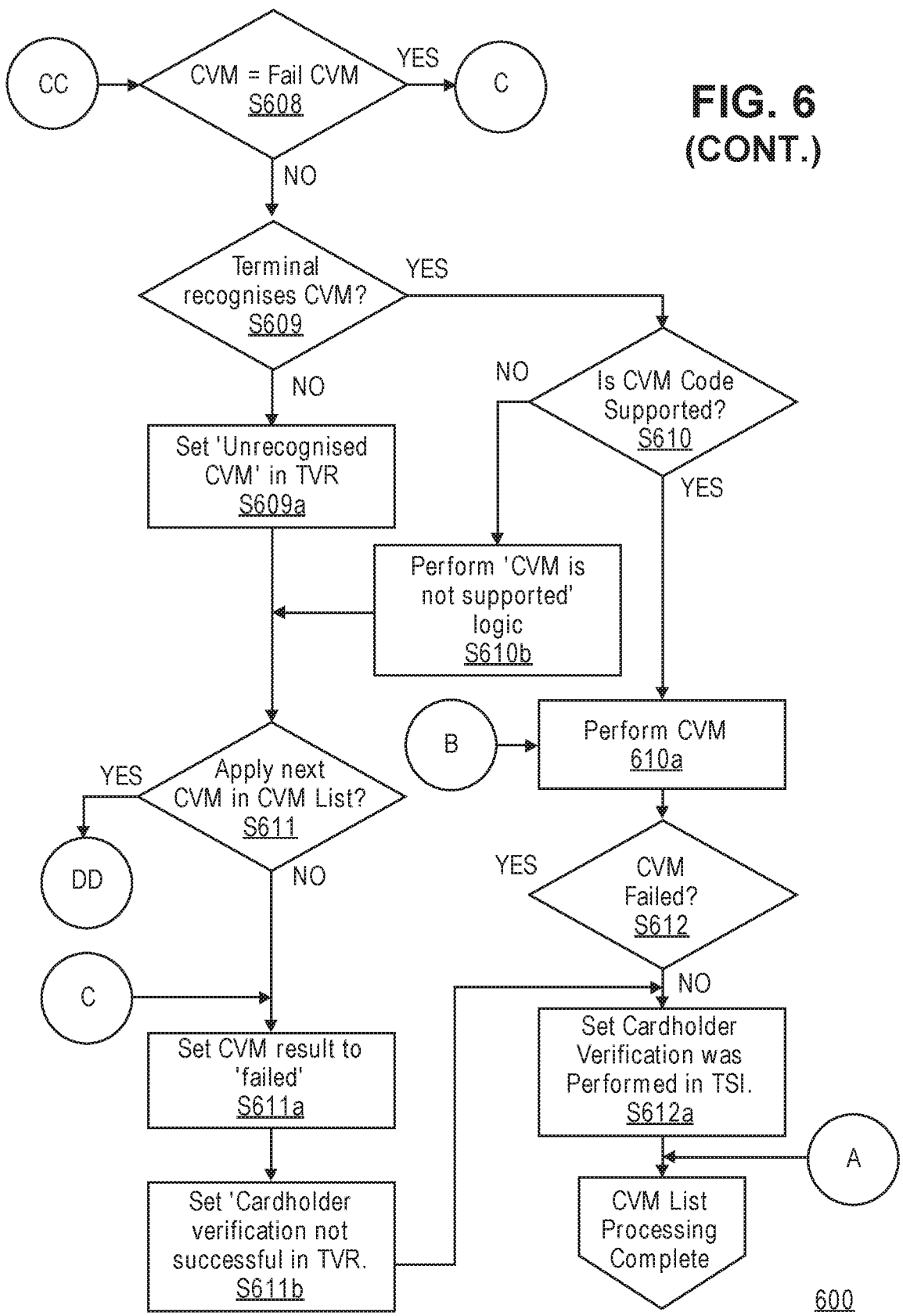

FIG. 6 shows a flowchart of an exemplary verification process executed by an access device such as a terminal according to an embodiment of the invention. The terminal may be any device capable of performing verification of a cardholder such as biometric terminal 120 of FIG. 1, access device 225 of FIG. 2 and FIG. 4, or access device 525 of FIG. 5. The terminal may accept an input such as an amount and may return an output such as a terminal verification result or "TVR." Process 600 is initiated by coupling portable device such as a card to the terminal, thereby initiating a session wherein a user (i.e. a cardholder) may be biometrically verified in a transaction. The card may be card 110 of FIG. 1, portable device 215 of FIG. 2 and FIG. 3 (e.g. an integrated circuit card or ICC), and/or portable device 515 of FIG. 5. The cardholder that is biometrically verified may be user 210 of FIG. 2 and/or user 510 of FIG. 5.

Once the session has been initiated, the CVM list processing may begin so that the cardholder may be biometrically verified. In step S601, the terminal reads an application interchange profile or AIP to determine the compatibility of the card with the terminal. The AIP is a data element on the card that indicates the capabilities of the card to support a specific function in an application such as CVM processing. If the terminal determines that the card does not support CVM processing, the terminal performs step S601a in the process. In step S601a, the terminal sets the CVM results to 'No CVM performed' and the session is terminated. Conversely, if the terminal determines in step S601 that the card does support CVM processing, the terminal moves on to step S602.

In step S602, the terminal reads a CVM list on the card and determines if the CVM list contains cardholder verification (CV) rules. The CVM list may be an ordered list of data fields encoded in binary that indicates the types of CVM supported by the card, the conditions in which each CVM should be applied, and their preferred order. The cardholder verification rules may be rules that indicate under which conditions a specific CVM may be performed. For example, a CV rule may consist of 2 bytes. The first byte may indicate the type of CVM to be used (e.g., biometric, PIN, etc.), while the second byte may specify (e.g., only in cash back transactions, only for specific dollar amounts, etc.) in which condition this CVM will be applied.

If the terminal determines that the CVM list contained on the card contains no CV rules, the terminal performs step S602a. In step S602a, the terminal sets the TVR to 'ICC Data Missing' indicating that the integrated circuit card is missing data required for processing the CVM. The terminal then performs step S601a before terminating the session.

If the terminal determines in step S602 that CV rules are present, the terminal performs step S602b and selects the first CV rule in the CVM list. In step S603, the terminal determines if the CV rule selected is "CVM condition='Always'" indicating that the CVM can always be applied, in which case the terminal moves on to step S608 discussed below. Otherwise, the terminal initiates step S604. In step S604, the terminal determines if the CV rule selected is "CVM Condition='if terminal supports CVM'", in which case the terminal initiates step S605, wherein the terminal determines if the CVM code on the card is supported by the terminal so that the terminal may move on to performing the CVM (i.e. biometric verification). For example, the terminal may attempt to match the biometric solution ID of the terminal with the biometric solution ID of the card to determine that the card and the terminal support the same biometric program. If the CVM code is supported, the terminal may perform the CVM. Otherwise, the terminal moves on to step S607 discussed below.

If at step S604 the selected CV rule is not "CVM Condition='if terminal supports CVM'", then the terminal initiates step S606. In step S606, the terminal determines if the selected CV rule is satisfied. If the selected CV rule is not satisfied, the terminal moves on to step S607 to determine if there are any more CVM entries. If there are more CVM entries present in the CVM list, the terminal may repeat the same process with the next CV rule in the CVM list at step S602b. If there are no more CVM entries present in the CVM list, the cardholder verification will be considered a failure and the CVM result is set to 'fail'.

If at step S606 the selected CV rule is satisfied, the terminal moves on to step S608. In step S608, the terminal determines if the CVM has failed due to any other format error. For example, the terminal may determine that specific data required by a CVM rule is missing such as an application currency code or an amount of the transaction. If the CVM has not failed, the terminal initiates step S609. In step S609, the terminal determines if it recognizes the CVM on the card, in which case the terminal moves on to step S610. Otherwise, the terminal performs step S609a and sets the TVR (terminal verification result) to 'Unrecognized CVM'.

In step S610, the terminal determines if the CVM code on the card is supported by the terminal. If the CVM code on the card is not supported by the terminal, the terminal moves on to step S610b and performs logic corresponding to a verification result of 'CVM is not supported'. After the logic is performed, the terminal moves on to step S611. Step S611 determines if the terminal may try the next CVM on the CVM list when a particular CVM fails, in which case the terminal returns to step S607. Otherwise, the terminal sets the CVM result to 'failed' in step S611a and then sets the TVR to 'Cardholder verification not successful' in step S611b.

If at step S610 the terminal determines that the CVM code on the card is supported by the terminal, the terminal may then perform step S610a and performs the CVM. For example, the terminal may recognize that the CVM read on the card is of fingerprint verification and may then perform the appropriate algorithm. Once the CVM is performed and it is determined in step S612 that the CVM has not failed, then the terminal sets transaction status information (TSI) to 'Cardholder Verification was Performed' in step S612a and the process is completed.

Figure 7:
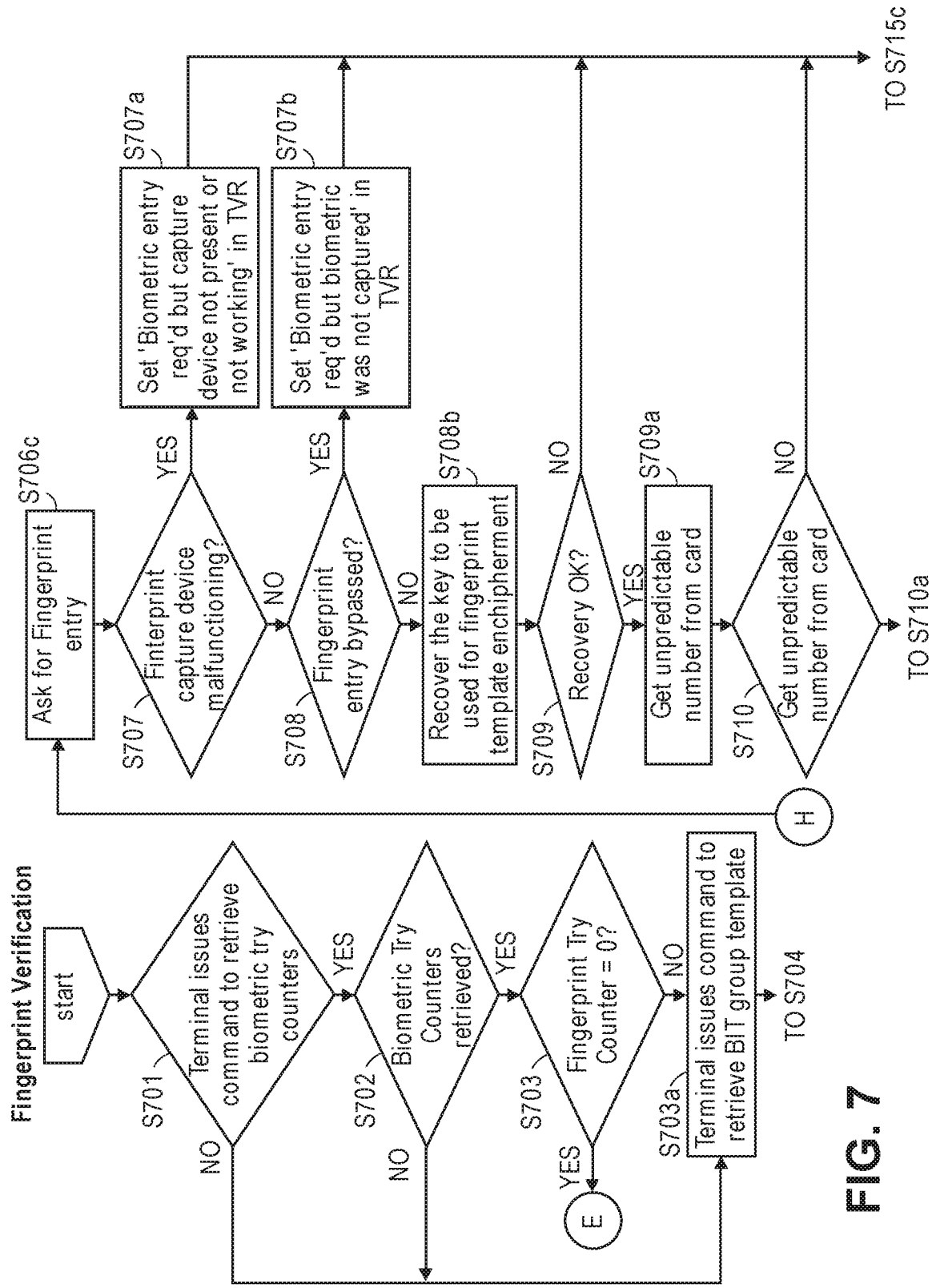
FIG. 7 shows a flowchart illustrating an exemplary cardholder verification method executed by an access device according to an embodiment of the invention.
Figure 7:
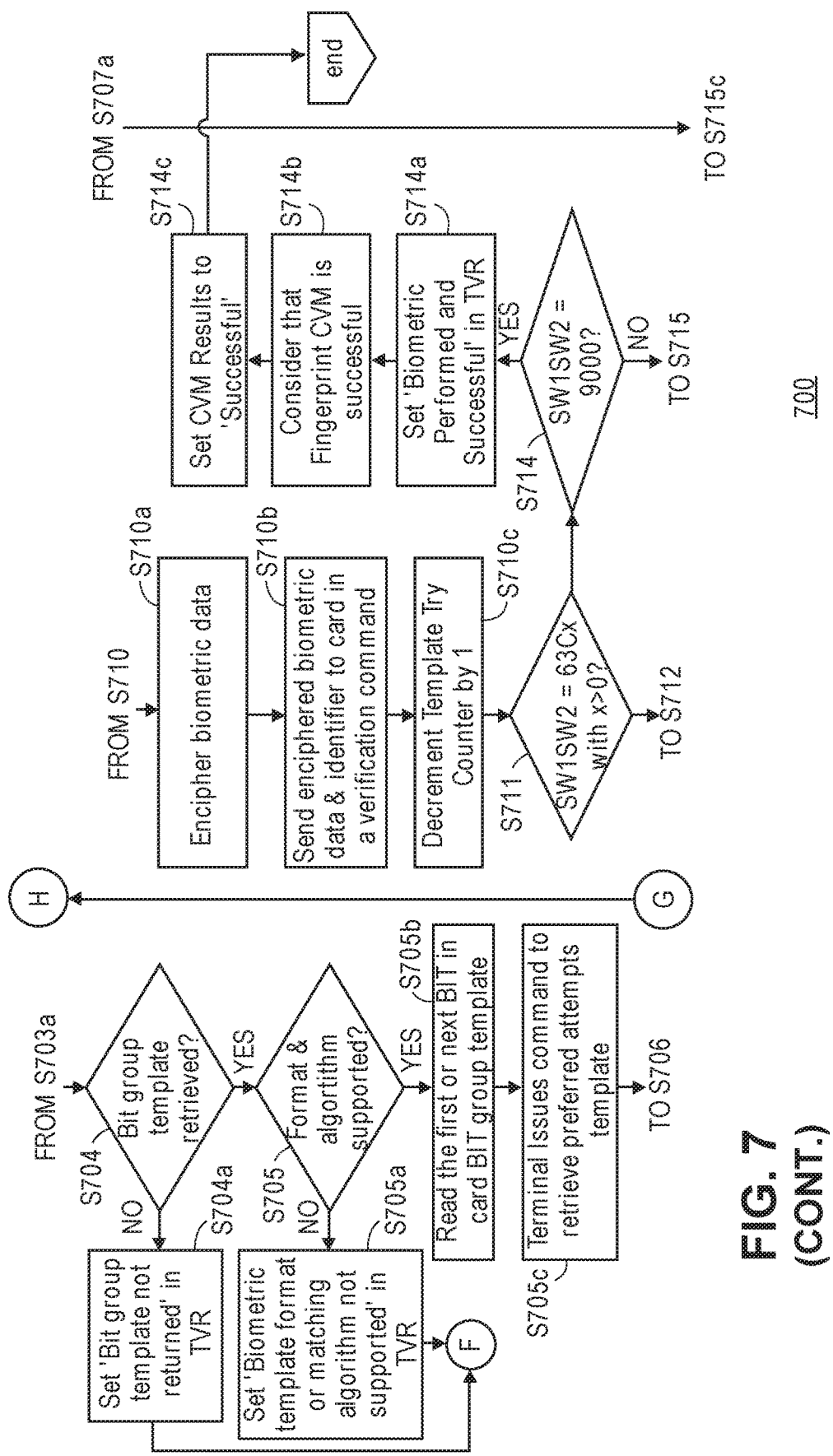
Figure 7:
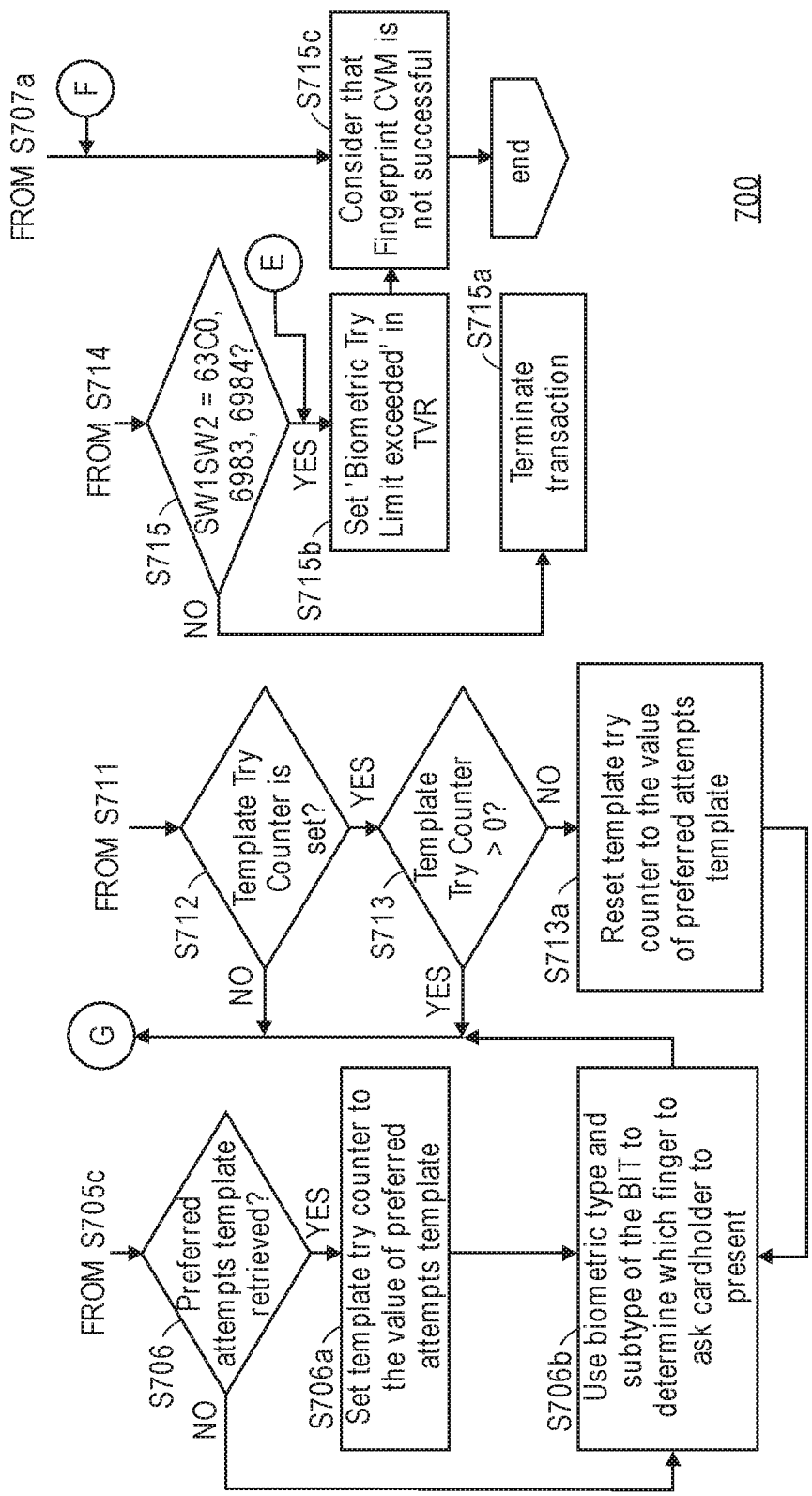

FIG. 7 shows an exemplary cardholder verification method executed by a terminal coupled to a card according to an embodiment of the invention. The CVM shown in FIG. 7 corresponds to fingerprint verification. It should be understood that the same or similar method may be followed for the verification of a cardholder's palm, iris, voice, face or any other biometric sample.

The CVM shown can be described by a set of commands and responses sent between the terminal and the card, which communicate data relating to biometric verification such as preferred amount of attempts, attempts remaining, verification results etc. The data may be indicated by pre-determined values that both the terminal and card can understand. For example, the card may communicate match and/or verification results to the terminal using a value labeled as 'SW1SW2', which may be defined by Table 1 below:

TABLE 1

Verification Results

| SW1SW2 Value | Verification Result |
| --- | --- |
| '9000' | "Successful match" |
| '6983' or '6984' | "Error during biometric data decipherment" |
| '63Cx' (x is an integer greater than zero) | "Failed with 'x' tries remaining" |
| '63C0' | "Failed and the biometric try limit has been exceeded" |

The terminal may be instructed to perform the CVM after a set of CVM list processing steps have been completed as described by FIG. 6. For example, the terminal may first initiate step S605 or step S610 of FIG. 6 to determine if the CVM code on the card is supported by the terminal before attempting to perform the CVM. Once, the terminal has determined that the CVM code on a presented card is supported, process 700 may begin. In step S701, the terminal determines if it needs to issue a command to the card in order to retrieve biometric try counters from the card. A biometric try counter may be a set value stored on a card that decrements each time a cardholder attempts to verify a different biometric sample. For example, a verification entity may set the fingerprint try counter on a card to the value of '5', and during a transaction the card would decrement the value each time it attempted to verify one of the user's fingers. In step S702, the terminal transmits the command to the card, which then returns a response back to the terminal.

Figure 8:
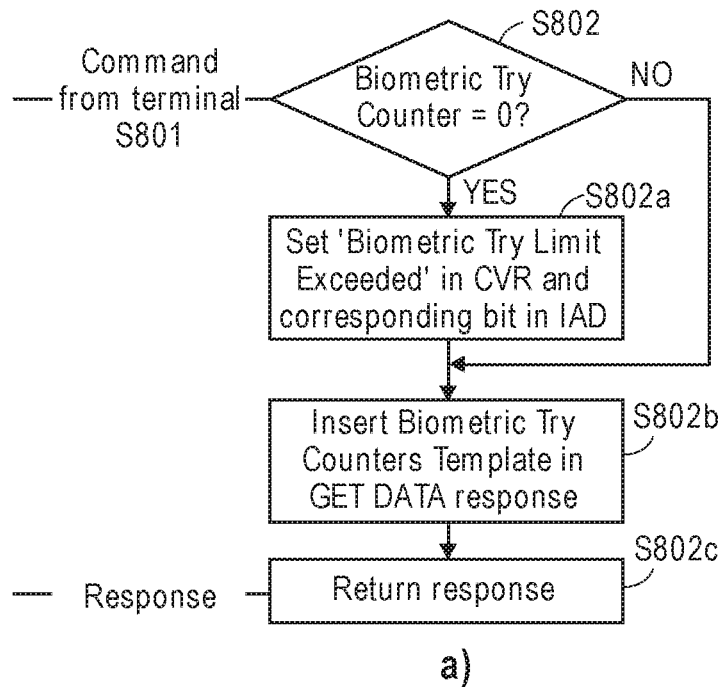
FIG. 8 shows a set of commands transmitted by an access device and executed by a portable device according to an embodiment of the invention.
Figure 8:
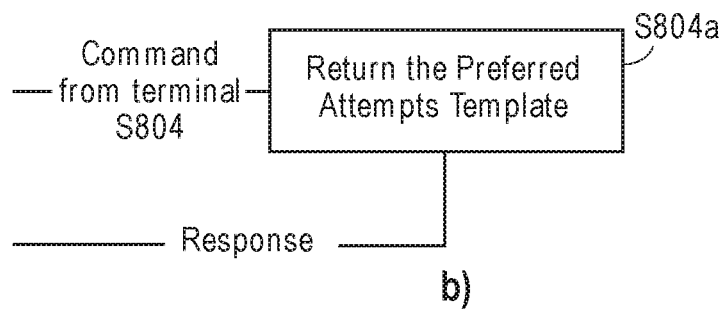
Figure 8:
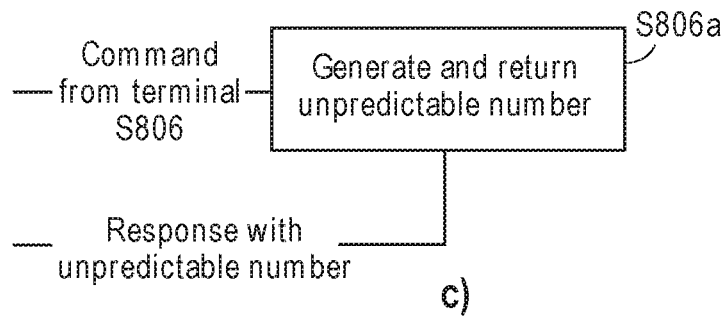

FIG. 8a, shows how a command from a terminal to retrieve biometric try counters initiates a method performed by a card. In step S801, the command is received by the card. In step S802, the card determines if the biometric try counter for the biometric type is equal to 0, thereby indicating that the biometric try limit has been exceeded. If the answer to step S802 is "YES", then the card sets a CVR (card verification result) as well as a corresponding bit in an IAD (Issuer Application Data) stored on the card to 'Biometric Try Limit Exceeded' before moving on to step S802b. The CVR can be used by a card to communicate verification results to a terminal during a matching session, and the IAD can be used to contain the biometric verification results and may be transmitted to an issuer or verification entity. Otherwise, the card moves directly to step S802b. In step S802b, the card inserts the biometric try counters template in a response. In step S802c, the response is returned and sent back to the terminal.

Returning to FIG. 7, once the biometric try counters have been successfully retrieved from the card in a response, the terminal initiates step S703. In step S703, the terminal reads the response, and if the biometric try counter is equal to 0, then the terminal sets the TVR to 'Biometric Try Limit exceeded', considers that the biometric verification was not successful and terminates the CVM. Otherwise, the terminal performs step S703a. In step S703a, the terminal issues a command to retrieve a card BIT group template from the card.

The card BIT group template may be data that identifies the number of biometric information templates or BITs on a card as well as the sequence in which different biometric subtypes are requested for verification. The terminal can use the sequence of the BITs listed in the card BIT group template to determine which biometric subtype the terminal may ask the user to present for verification. The terminal may also read a preferred attempts template, which may be a value set by a verification entity indicating how many verification attempts are allowed to verify using a single BIT for a given biometric type. As an example, the fingerprint preferred attempts may be configured as 3 and the Card BIT Group Template may be configured as follows:

BIT 1—right index finger
BIT 2—right middle finger

Then, if Fingerprint is selected by the terminal as the CVM, the terminal may ask the user to present his or her right index finger first since it is first in the list. If the verification of the right index finger fails after 3 tries and the Fingerprint Try Counter is not zero, the terminal can move to the next finger on the list and ask the user to present the right middle finger up to 3 tries. The process may continue until either the ICC returns a successful match or the until fingerprint try counter decrements to zero.

In step S704, the terminal determines if the card BIT group template has been retrieved. If the card BIT group template has not been retrieved, the terminal performs step S704a and sets the TVR to 'BIT group template not returned' and the biometric verification is considered not successful. If the BIT group has been retrieved, then the terminal initiates step S705. In step S705, the terminal determines if the format and algorithm of the verification method stored on the card are supported by terminal. If the format and algorithm are not supported by the terminal, the terminal performs step S705a and sets the TVR to 'Biometric template format or matching algorithm not supported'. If the format and algorithm are supported by the terminal, the terminal performs step S705b and reads the first BIT in the BIT group template and retrieve the corresponding preferred attempts template from the card.

Once the first biometric has been read, the terminal transmits a command to the card to retrieve the preferred attempts template in step S705c. The command used to retrieve the preferred attempts template is shown in FIG. 8b. In step S804, the card receives the command from the terminal. In step S804a, the card returns the preferred attempts template in a response and transmits the response to the terminal.

Referring back to FIG. 7, in step S706 the terminal determines if the preferred attempts template have been retrieved from the card. If the preferred attempts template have been retrieved, the terminal performs step S706a and sets the template try counter to the value contained in the preferred attempts template before performing step S706b. Otherwise, the terminal skips directly to step S706b. In step S706b, the terminal uses the biometric type and subtype contained in the BIT stored on the card to determine which finger or which biometric sample to ask the cardholder to present as indicated by the values shown in tables 2 and 3 below.

TABLE 2

Biometric Type

| Name of Biometric Type | Value |
|---|---|
| Facial Features | '02' |
| Fingerprint | '08' |
| Iris | '10' |
| Palm Print | '020000' |
| Voice | '04' |

TABLE 3

Biometric Subtype

| b8 | b7 | b6 | b5 | b4 | b3 | b2 | b1 | Subtype |
|---|---|---|---|---|---|---|---|---|
| 0 | 0 | 0 | 0 | 0 | 0 | 0 | 0 | Multiple |
| x | x | x | x | x | x | 0 | 1 | Right |
| x | x | x | x | x | x | 1 | 0 | Left |
| x | 0 | x | 0 | 0 | 0 | x | x | No meaning |
| x | 0 | x | 0 | 0 | 1 | x | x | Thumb |
| x | 0 | x | 0 | 1 | 0 | x | x | Index finger |
| x | 0 | x | 0 | 1 | 1 | x | x | Middle finger |
| x | 0 | x | 1 | 0 | 0 | x | x | Ring finger |
| x | 0 | x | 1 | 0 | 1 | x | x | Little finger |
| x | x | 1 | x | x | x | x | x | Always Set |
| x | 1 | x | 0 | 0 | 1 | x | x | Palm |
| x | 1 | x | 0 | 1 | 0 | x | x | Back of hand |
| x | 1 | x | 0 | 1 | 1 | x | x | Wrist |

In step S706c, the terminal asks for the specific fingerprint or biometric sample from the cardholder, which will be captured using a biometric reader. The cardholder may then present a biometric sample to the terminal's biometric reader for capture. In step S707, the terminal determines if the biometric reader is malfunctioning. If the biometric reader is malfunctioning, the terminal performs step S707a, wherein the terminal sets the TVR to 'Biometric entry required but capture device not present or not working' and the terminal considers that the CVM was not successful. If the biometric reader is not malfunctioning, the terminal initiates step S708.

In step S708, the terminal determines if the fingerprint entry or capture of the biometric sample has been bypassed. For example, the user may have missed a set time frame that the biometric reader allows a user to present his or her biometric sample. If the fingerprint entry or capture of the biometric sample has been bypassed, the terminal performs step S708a and sets the TVR to Biometric entry required but biometric was not captured' and the terminal considers that the CVM was not successful. If the fingerprint entry or capture of the biometric sample has not been bypassed, the terminal performs step S708b. In step S708b, the terminal recovers a data encipherment key needed to encipher a biometric sample template of the captured biometric sample. In step S709, the terminal determines if it has successfully recovered the data encipherment key. If the terminal has not successfully recovered the data encipherment key, the terminal considers that the CVM was not successful and terminates the biometric verification process. Otherwise, the terminal performs step S709a.

In step S709a, the terminal gets an unpredictable number to use during encipherment by transmitting a command to the card as shown in FIG. 8c. Looking at FIG. 8c, the card receives a command from the terminal to generate and send an unpredictable number in step S806. In step S806, the card generates an unpredictable number and returns the unpredictable number in a response and sends the response back to the terminal.

Referring back to FIG. 7, in step S710 the terminal determines if an unpredictable number was received from the card. If the determination in step S710 is "NO", then the terminal considers that the CVM was not successful. Otherwise, the terminal performs step S710a. In step S710a, the terminal enciphers the biometric sample template. In step S710b, the terminal sends the enciphered biometric sample template to the card in a verification command as shown in FIG. 9, which is further described below.

In step S710c, the terminal decrements a template try counter in the card by 1. The template try counter may be a value on the card that the terminal decrements each time the card verifies a biometric sample template of a given biometric subtype. For example, a cardholder may attempt to verify a biometric sample of his or her right thumb to a terminal multiple times, and after each attempt the terminal decrements the template try counter by 1 until the template try counter reaches zero.

In step S711, the terminal determines if a value stored on the card identified as SW1SW2 is equal to 63Cx, where x is greater than 0. If the determination is "YES", then the terminal determines if the template try counter has been set in step S712, in which case the terminal initiates step S713. Otherwise, the terminal returns to step S706c. In step S713, the terminal determines if the template try counter is greater than 0, in which case the terminal returns to step S706c. Otherwise the terminal performs step S713a. In step S713a, the terminal resets the template try counter to the value stored in the preferred attempts template and reads the next fingerprint in the card BIT group template by returning to step S706b. If in step S711 the terminal determines that SW1SW2 is not equal to 63Cx where x is greater than 0, the terminal then initiates steps S714.

In step S714, the terminal determines if SW1SW2 is equal to '9000' indicating that verification was successful. If at step S714 the terminal determines that SW1SW2 is not equal to '9000', the terminal then initiates step S715. In step S715, the terminal determines if SW1SW2 is equal to 63C0, 6983, or 6984. If SW1SW2 is not equal to any of these values, the terminal terminates the transaction in step S715a. However, if SW1SW2 is equal to any one of the values, the terminal sets the TVR to 'Biometric try limit exceeded' in step S715b. In step S715c, the terminal considers that the CVM was not successful and ends the CVM process.

If at step S714, the terminal determines that the verification was successful, the terminal performs step S714a. In step S714a, the terminal sets the TVR to 'Biometric performed and successful'. In step S714b, the terminal considers that the CVM was successful. In step S714c, the terminal sets a CVM result to 'successful' and completes the biometric verification process.

Figure 9A:
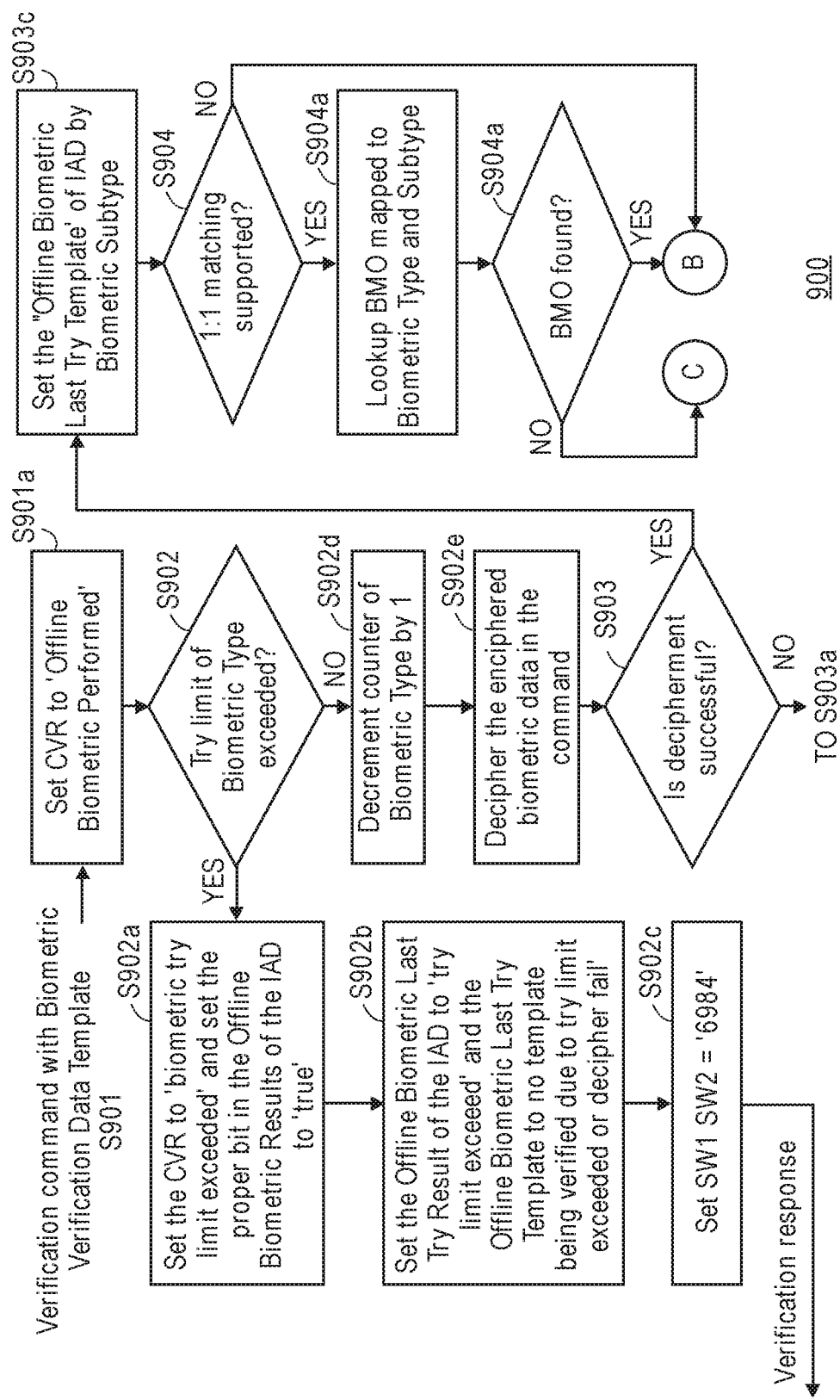
FIG. 9A and FIG. 9B show an exemplary method of biometric verification executed by a portable device according to an embodiment of the invention.
Figure 9A:
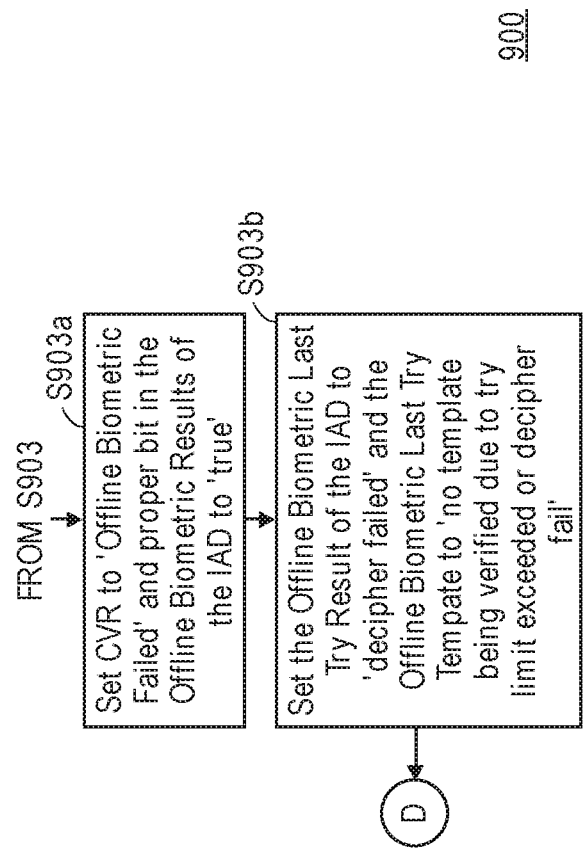
Figure 9B:
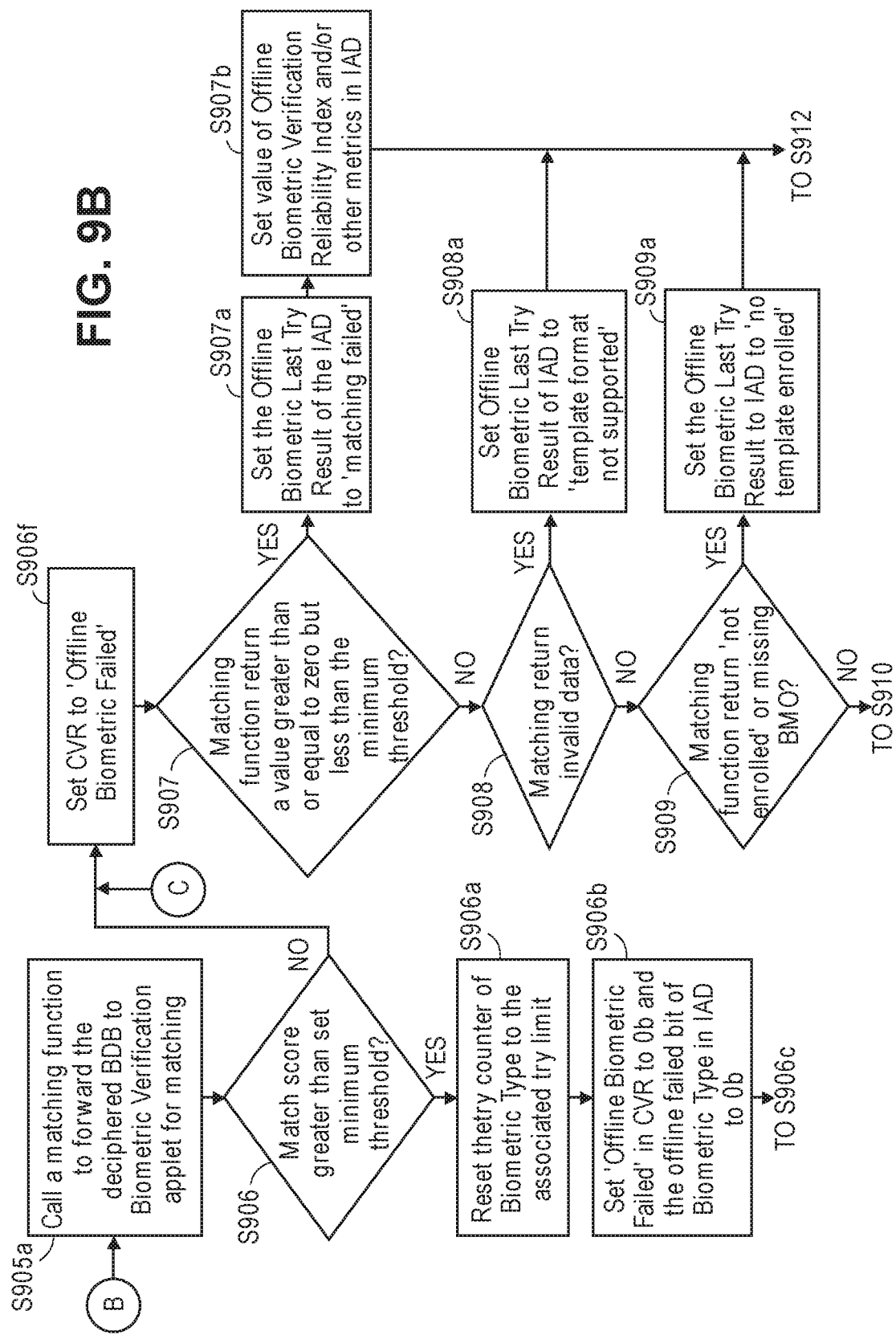
Figure 9B:
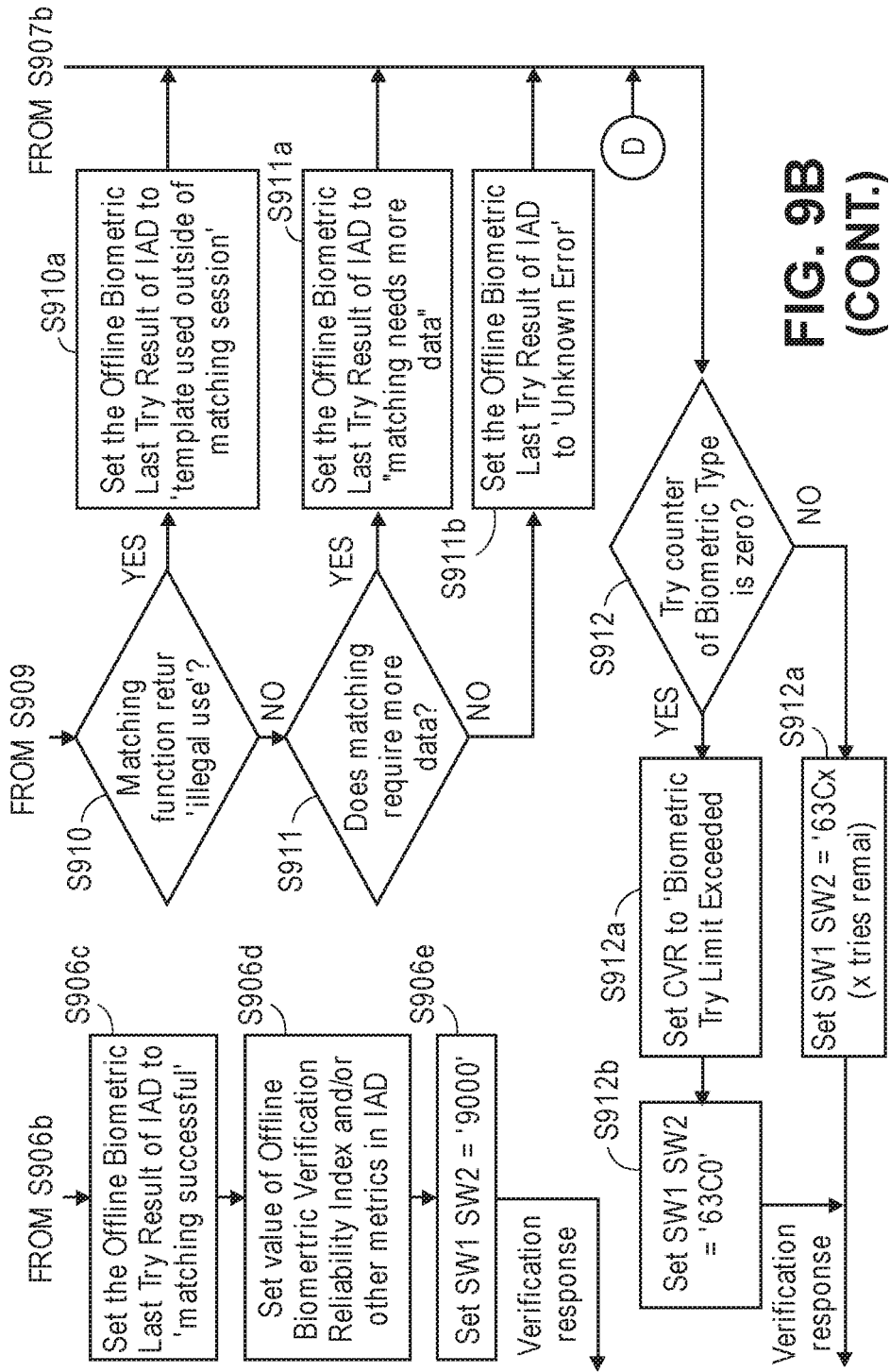

FIGS. 9A and 9B show a flowchart of an exemplary biometric verification process executed by a portable device such as a card according to an embodiment of the invention. The card may be card 110 of FIG. 1, portable device 215 of FIG. 2 and FIG. 3, or the portable device 515 of FIG. 5. For performing biometric verification by the portable device, the following data elements and corresponding values may be used:

TABLE 4

| Name | Value/Description |
|---|---|
| Application Default Action (ADA) | bit 8: 1b = If Biometric Verification Results Mismatch, transmit transaction online<br>bit 7: 1b = If Biometric Verification Results Mismatch, decline if unable to transmit transaction online<br>bit 6: 1b = If Biometric Try Limit exceeded, transmit transaction online<br>bit 5: 1b = If Biometric Try Limit exceeded, decline if unable to transmit transaction online<br>bit 4: 1b = If Offline PIN verification not performed or not successful, send transaction online<br>bit 3: 1b = If Offline PIN verification not performed, decline if unable to transmit transaction online<br>bit 2: 1b = If Offline PIN verification not successful, decline if unable to transmit transaction online<br>bit 1: Discretionary |
| Cardholder Verification Method (CVM) List | CVM Code:<br>CVM Type:<br>000000b = Fail CVM processing<br>000001b = Plaintext PIN verification performed by ICC<br>000010b = Enciphered PIN verified online<br>000011b = Plaintext PIN verification performed by ICC and signature (paper)<br>000100b = Enciphered PIN verification performed by ICC<br>000101b = Enciphered PIN verification performed by ICC and signature (paper)<br>011110b = Signature (paper)<br>011111b = No CVM required<br>000100b-011101b = Discretionary<br>100000b = Fingerprint<br>100001b = Palm<br>100010b = Iris<br>100011b = Voice<br>100100b = Facial |
| Card Verification Results (CVR) | bit 8: 1b = Biometric Try Limit Exceeded<br>bit 7: 1b = Offline Biometric Performed<br>bit 6: 1b = Offline Biometric Failed<br>bit 5-2: Discretionary<br>bit 1: Secure Messaging uses key-based derivation |
| Issuer Application Data (IAD) | Offline Biometric Last Try Result:<br>00000000b = matching successful<br>00000001b = matching failed<br>00000010b = template format not supported<br>00000011b = no template enrolled<br>00000100b = template used outside of matching session<br>00000101b = matching need more data<br>00000110b = decipher failed<br>00000111b = try limit exceeded<br>11111111b = Unknown error<br>Offline Biometric Last Try Template:<br>00000000b = Face<br>00000001b = Left thumb finger<br>00000010b = Left index finger<br>00000011b = Left middle finger<br>00000100b = Left ring finger<br>00000101b = Left little finger<br>00000110b = Right thumb finger<br>00000111b = Right index finger<br>00001000b = Right middle finger<br>00001001b = Right ring finger<br>00001010b = Right little finger<br>00001011b = Left iris<br>00001100b = Right iris<br>00001101b = Left palm<br>00001110b = Right palm<br>00001111b= Voice<br>11111110b = no information given by Biometric Subtype<br>11111111b = no template being verified due to try limit exceeded or decipher fail<br>Offline Biometric Results:<br>bit 8: Facial Try Limit Exceeded<br>bit 7: Offline Facial Performed<br>bit 6: Offline Facial Failed<br>bit 5: Fingerprint Try Limit Exceeded<br>bit 4: Offline Fingerprint Performed<br>bit 3: Offline Fingerprint Failed<br>bit 2: Iris Try Limit Exceeded<br>bit 1: Offline Iris Performed<br>Offline Biometric Results (continued):<br>bit 8: Offline Iris Failed<br>bit 7: Palm Try Limit Exceeded<br>bit 6: Offline Palm Performed<br>bit 5: Offline Palm Failed<br>bit 4: Voice Try Limit Exceeded<br>bit 3: Offline Voice Performed<br>bit 2: Offline Voice Failed<br>bit 1: Discretionary |

The process 900 is initiated in step S901 by a verification command received by the card from a terminal which contains enciphered biometric sample template data that the card will verify. In step S901a, the card sets the CVR to 'Offline Biometric Performed'.

In step S902, the card determines if a biometric try limit been exceeded. The biometric try limit can be a value stored in the card that determines the maximum amount of times a cardholder may verify a biometric sample of a specific biometric type in an authentication session. For example, the finger try limit may be set to '5', indicating that the cardholder may only attempt to verify up to five biometric samples of the cardholder's finger, no matter which finger is presented each time. If the biometric try limit has been exceeded, then the card performs step S902a. In step S902a, the card sets CVR to 'biometric try limit exceeded' and sets the proper bit in the Offline Biometric Results of the IAD to 'true'. In step S902b, the card sets the Offline Biometric Last Try Result of the IAD to 'try limit exceeded' and the Offline Biometric Last Try Template to 'no template being verified due to try limit exceeded or decipher fail'. In step S902c, the card sets a value identified as SW1 SW2 to '6984' and submits a verification response back to the terminal containing verification results.

If in step S902 it is determined that the biometric try limit not been exceeded, the card initiates step S902d. In step S902d, the card decrements biometric try counter by 1. In step S902e, the card deciphers the enciphered biometric sample data received in the verification command.

In one embodiment, the enciphered biometric sample data may be deciphered according to an RSA-KEM algorithm defined in [ISO 18033-2]. The decipherment process may be performed as follows:

1. The card recovers the private key used for biometric data encipherment/decipherment. The key has exponent D and modulus N.
2. With the private key recovered, the card may decrypt the Enciphered Biometric Data using RSA-KEM algorithm defined in [ISO 18033-2] in the following way:
   a. The card decrypts the Enciphered Biometric Key Seed C: R=RSATransform (C, D, N), as defined in [ISO 18033-2].
   b. The card generates two TDES keys using K=KDF (R, 48). The 16 most significant bytes of K is the Biometric Encryption Key BEK and the 32 least significant bytes of K is the Biometric MAC Key BMK.
   c. The card verifies the HMAC as defined in [ISO/IEC 9797-2] with the Biometric MAC Key BMK.
   d. The card decrypts the Enciphered Biometric Data using the DEM1 mechanism, defined in [ISO 18033-2], with the Biometric Encryption Key BEK generated in step b.

If any of the steps above fails, the CVM has failed.

3. The card can verify whether the ICC Unpredictable Number recovered from the Enciphered Biometric Data equals the ICC Unpredictable Number generated by the card. If they are not the same, Offline Biometric CVM has failed.
4. The card shall verify whether the Data Header recovered from the Enciphered Biometric Data is equal to '7F'. If they are not the same, Offline Biometric CVM has failed.
5. The card shall verify whether the Biometric Solution ID recovered from the Enciphered Biometric Data is equal to the Biometric Solution ID received from the terminal. If they are not the same, Offline Biometric CVM has failed.
6. The card can verify whether the Biometric Type recovered from the Enciphered Biometric Data is equal to the Biometric Type received from the terminal. If they are not the same, Offline Biometric CVM has failed.
7. The card can generate a HMAC on the Enciphered Biometric Data as defined in [ISO/IEC 9797-2]. If the generated value is not the same as the MAC received from terminal, Offline Biometric CVM has failed.

In step S903, the card determines if decipherment was successful. If the decipherment is not successful, the card performs step S903a. In step S903a, the card sets the CVR to 'Offline Biometric Failed' and sets the proper bit in the Offline Biometric Results of the IAD to 'true'. In step S903b, the card sets the Offline Biometric Last Try Result of the IAD to 'decipher failed' and the Offline Biometric Last Try Template to 'no template being verified due to try limit exceeded or decipher fail' and proceeds to check if the try count of the biometric type is zero before sending out the verification response to the terminal.

If at step S903 it is determined that the decipherment was successful, then the card performs step S903c. In step S903c, the card sets the 'Offline Biometric Last Try Template' of the IAD by to the specific biometric subtype of the biometric sample template that is to be verified. In step S904, the card determines if 1:1 matching is supported. If 1:1 matching is supported by the card, then the card performs step S904a. In step S904a, the card looks up a biometric matching object (BMO) mapped to the same biometric type and biometric subtype as the biometric sample template. In step S905, it is determined if the BMO was found. If the BMO was not found, the card skips to step S906f in the process. If the BMO was found or if 1:1 matching was determined in S904 to not be supported by the card, the card initiates step S905a.

In step S905a, the card calls a matching function to forward deciphered biometric sample data to a biometric verification applet on the card for matching. The card biometric verification applet compares the biometric sample template received to a biometric reference template in the BMO. In step S906, the card determines if the match function returns a match score that is greater than a pre-set minimum threshold required for a successful match. If the match score is greater than the threshold, the card performs step S906a. In step S906a, the card resets the biometric try counter to its original value as set by verification entity preferences. In step S906b, the card sets the 'Offline biometric failed' bit in the CVR to 'false' (indicating that biometric verification did not fail and the biometric sample was verified). In step S906c, the card sets the Offline Biometric Last Try Result of the IAD to 'matching successful'. In step S906d, the card sets additional data of the IAD which may comprise of a biometric verification reliability index or some other metric or data regarding the number of verification attempts made by the user. In step S906e, the card sets a value identified as SW1 SW2 to '9000' signifying that the biometric sample template was verified (i.e. the biometric sample template matched a biometric reference template) and sends the verification response containing verification results back to the terminal.

If at step S906 it was determined that the match score was below the threshold, the card initiates step S906f. In step S906f, the card sets the CVR to 'Offline Biometric Failed'. In step S907, the card determines if the match score is greater than 0 but less than the threshold. If the determination made in step S907 is "YES", the card performs step S907a. In step S907a, the card sets the Offline Biometric Last Try Result of the IAD to 'matching failed'. In step S907b, the card sets data in the IAD to the value of the Offline Biometric Verification Reliability Index and/or other metrics relating to the amount of verification attempts made by the user.

If at step S907, the determination made is "NO", the card initiates step S908. In step S908, the card determines if the match function returned an output of 'invalid data'. If the output of 'invalid data' was returned, the card performs step S908a and sets the Offline Biometric Last Try Result of the IAD to 'template format not supported'. Otherwise, the card initiates step S909. In step S909, the card determines if the match function returned an output of 'not enrolled', in which case the card performs step S909a and sets the Offline Biometric Last Try Result of the IAD to 'no template enrolled'. Otherwise, the card initiates step S910. In step S910, the card determines if the match function returned an output of 'illegal use', in which case the card sets the Offline Biometric Last Try Result of the IAD to 'template used outside of matching session' in step S910a. Otherwise, the card initiates step S911. In step S911, the card determines if the match function returned an output of stating that more data is required to perform matching, in which case the card sets the Offline Biometric Last Try Result of the IAD to 'matching needs more data' in step S911a. Otherwise, the card performs step S911b. In step S911b, the card sets the Offline Biometric Last Try Result of the IAD to 'Unknown Error'.

In step S912, the card determines if the try counter of the Biometric Type is zero. If the try counter of the biometric type is zero, the card performs step S912a. In step S912a, the card sets the CVR to 'Biometric Try Limit Exceeded'. In step S912b, the card sets SW1 SW2 equal to '63C0' and returns the verification response containing verification results back to the terminal. If in step S912 the card determines that the try counter of the Biometric Type is not zero, the card performs step S912c before sending the verification response containing the verification results back to the terminal. In step S912c, the card sets SW1 SW2='63Cx', signifying that 'x' amount tries remain. The cardholder may then attempt the verification process using a different biometric sample 'x' amount of times or until he or she is successfully verified.

Embodiments of the invention have a number of advantages by providing a number of verification entity preferences on a portable device that is used to conduct a transaction, specific verification processes may be conducted at access devices that are remotely located with respect to the verification entities. As such the verification entities need not implement or create additional systems and procedures to accommodate biometric authentication processes that might be standardized across all verification entities. This embodiments of the invention can result in improved biometric verification processing while minimizing or eliminating the need to create customized systems for each verification entity. In addition, some embodiments of the invention may allow a portable device or access device to supply additional data regarding the biometric verification process in an authorization request message that is sent to an authorizing entity. As noted above, this assists the authorization entity in improving its fraud detection processes, which will improve its authorization processing. Such additional data can also allow the authorization entities to improve their biometric authentication processes by obtaining data regarding how the biometric verification processes are working.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art

What is claimed is:

1. A method comprising:
coupling a portable device comprising a biometric verification applet comprising biometric reference template data to an access device comprising a biometric reader, wherein the biometric reference template data comprises a biometric reference template of a user of the portable device and verification entity preferences;
maintaining, by the portable device, information that specifies a plurality of cardholder verification methods, the plurality of cardholder verification methods indicating types of biometric verifications supported by the portable device;
transmitting, by the portable device to the access device, the information;
receiving, by the portable device and from the access device, a biometric sample template of the user using the portable device, the biometric sample template corresponding to a type of biometric verification supported by a cardholder verification method of the plurality of cardholder verification methods specified by the information;
verifying, by the portable device, the biometric sample template by comparing the biometric sample template to the biometric reference template;
providing, by the portable device, to the access device, a verification result of the verification of the biometric sample template, and
providing, by the biometric verification applet of the portable device and to the access device, additional data relating to a process of verifying the biometric sample template, wherein the additional data comprises an offline biometric verification reliability index, a false accept rate, a false reject rate, a matching score of the biometric sample template and the biometric reference template, and a threshold of the matching score of the biometric sample template and the biometric reference template.

2. The method of claim 1, wherein the access device, after receiving the verification result, transmits an authorization request message with the verification result and the additional data to a verification entity that issued the verification entity preferences.

3. The method of claim 2 wherein the additional data further includes data regarding a number of verification attempts made by the user.

4. The method of claim 2 wherein the verification entity is an issuer of the portable device, and the verification entity preferences comprises a first preferred type or subtype of biometric sample to be verified, a second preferred type or subtype of biometric sample to be verified after the first preferred type of biometric sample cannot be verified, and a preferred amount of verification attempts granted to the user.

5. The method of claim 2 wherein coupling the portable device to the access device comprises physically coupling the portable device to the access device.

6. A portable device comprising:
a processor; and
a computer readable medium, the computer readable medium comprising code, executable by the processor, to implement a method comprising:
maintaining, by the portable device, information that specifies a plurality of cardholder verification methods, the plurality of cardholder verification methods indicating types of biometric verifications supported by the portable device;
transmitting, by the portable device to an access device, the information;
receiving, by the portable device and from the access device, a biometric sample template of a user using the portable device, the portable device being coupled to the access device comprising a biometric reader, the portable device comprising a biometric verification applet comprising biometric reference template data, wherein the biometric reference template data comprises a biometric reference template of a user of the portable device and verification entity preferences, the biometric sample template corresponding to a type of biometric verification supported by a cardholder verification method of the plurality of cardholder verification methods specified by the information;
verifying, by the portable device, the biometric sample template by comparing the biometric sample template to the biometric reference template;
providing, by the portable device, to the access device, a verification result of the verification of the biometric sample template; and
providing, by the biometric verification applet of the portable device and to the access device, additional data relating to the process of verifying the biometric sample template, wherein the additional data comprises an offline biometric verification reliability index, a false, accept rate, a false reject rate, a matching score of the biometric sample template and the biometric reference template, and a threshold of the matching score of the biometric sample template and the biometric reference template.

7. The portable device of claim 6 wherein the access device, after receiving the verification result, transmits an authorization request message with the verification result and the additional data to a verification entity that issued the verification entity preferences.

8. The portable device of claim 6 wherein the additional data further includes data regarding a number of verification attempts made by the user.

9. The portable device of claim 6 wherein the verification entity is an issuer of the portable device, and the verification entity preferences comprises a first preferred type or subtype of biometric sample to be verified, a second preferred type or subtype of biometric sample to be verified after the first preferred type of biometric sample cannot be verified, and a preferred amount of verification attempts granted to the user.

10. The portable device of claim 6 wherein coupling the portable device to the access device comprises physically coupling the portable device to the access device.

11. A method comprising:
coupling a portable device comprising a biometric verification applet comprising biometric reference template data with an access device comprising a biometric reader, wherein the biometric reference template data comprises a biometric reference template of a user of the portable device and verification entity preferences, the portable device configured to maintain information that specifies a plurality of cardholder verification methods, the plurality of cardholder verification methods indicating types of biometric verifications supported by the portable device;
receiving, from the portable device, the information;
providing a prompt, by an interface of the access device for a biometric sample;
receiving the biometric sample from the interface;
providing, by the access device, a biometric sample template representing the biometric sample to the portable device, wherein the portable device compares the biometric sample template to the biometric reference template and produces a verification result, the biometric sample template corresponding to a type of biometric verification supported by a cardholder verification method of the plurality of cardholder verification methods specified by the information;
receiving, by the access device, the verification result from the portable device; and
receiving, by the access device and from the biometric verification applet of the portable device, additional data relating to a process of verifying the biometric sample template, wherein the additional data comprises an offline biometric verification reliability index, a false accept rate, a false reject rate, a matching score of the biometric sample template and the biometric reference template, and a threshold of the matching score of the biometric sample template and the biometric reference template.

12. The method of claim 11, wherein the access device, after receiving the verification result, transmits an authorization request message with the verification result and the additional data to a verification entity that issued the verification entity preferences.

13. The method of claim 12 wherein the additional data further includes data regarding a number of verification attempts made by the user.

14. The method of claim 12 wherein the verification entity is an issuer of the portable device.

15. An access device comprising:
a processor;
a biometric reader; and
a computer readable medium, the computer readable medium comprising code, executable by the processor, to implement a method comprising:
receiving, from a portable device coupled to the access device, verification entity preferences, the portable device configured to maintain information that specifies a plurality of cardholder verification methods, the plurality of cardholder verification methods indicating types of biometric verifications supported by the portable device;
receiving, from the portable device, the information;
receiving, from the biometric reader, a biometric sample template, the biometric sample template corresponding to a type of biometric verification supported by a cardholder verification method of the plurality of cardholder verification methods specified by the information;
sending, to the portable device, the biometric sample template;
receiving, from a biometric verification applet of the portable device, a verification result and additional data relating to a process of verifying the biometric sample template, wherein the verification result indicates if the biometric sample template matched a biometric reference template on the portable device, the additional data comprising an offline biometric verification reliability index, a false accept rate, a false reject rate, a matching score of the biometric sample template and the biometric reference template, and a threshold of the matching score of the biometric sample template and the biometric reference template; and generating, an authorization request message comprising the verification result and the additional data.

16. The access device of claim 15, wherein the additional data further includes data regarding a number of verification attempts made by a user.

17. The access device of claim 15, wherein the method implemented by the code further comprises:

sending, the authorization request message to a verification entity that issued the verification entity preferences.

* * * * *